US012283152B2

(12) United States Patent
Tran et al.

(10) Patent No.: US 12,283,152 B2
(45) Date of Patent: Apr. 22, 2025

(54) SYSTEM AND METHOD FOR MOUNTING A TOPPER SCREEN TO A GAMING MACHINE CABINET

(71) Applicant: Aristocrat Technologies Australia Pty Limited, North Ryde (AU)

(72) Inventors: Vinh Tran, Blacktown (AU); David Thompson, Mona Vale (AU); Deepak Chaudhari, Carlingford (AU); Muharrem Abali, Meadowbank (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/094,662

(22) Filed: Jan. 9, 2023

(65) Prior Publication Data

US 2023/0237867 A1 Jul. 27, 2023

Related U.S. Application Data

(60) Provisional application No. 63/301,714, filed on Jan. 21, 2022.

(51) Int. Cl.
*G07F 17/32* (2006.01)

(52) U.S. Cl.
CPC ...... *G07F 17/3216* (2013.01); *G07F 17/3211* (2013.01)

(58) Field of Classification Search
None
See application file for complete search history.

(56) References Cited

U.S. PATENT DOCUMENTS

| | | | | |
|---|---|---|---|---|
| 6,154,945 | A | 12/2000 | Voelzke | |
| 6,656,041 | B1 * | 12/2003 | Kaminkow | G07F 17/34 463/16 |
| 7,506,463 | B2 | 3/2009 | Holst | |
| 10,417,860 | B2 * | 9/2019 | Lewis | G07F 17/3216 |
| 11,151,833 | B2 * | 10/2021 | Hemerick | G07F 17/3211 |

(Continued)

*Primary Examiner* — Sunit Pandya
(74) *Attorney, Agent, or Firm* — Weaver Austin Villeneuve & Sampson LLP

(57) ABSTRACT

The present disclosure relates generally to system and method for mounting a topper screen and mounting bracket to the frame of a gaming machine cabinet. The topper mounting bracket may include an angled mounting plate, a topper electrical connector fastened to the angled mounting plate, and at least one mounting bolt fastened to and protruding from the angled mounting plate. The cabinet frame may include an angled mounting surface, a movable cabinet electrical connector coupled to the angled mounting surface, and at least one key slot positioned on the angled mounting surface. The topper mounting bracket may be mounted to the cabinet frame by aligning and engaging the at least one mounting bolt with the at least one key slot. Once engaged, the topper mounting bracket and topper screen is secured to the gaming machine cabinet allowing an installer to establish an electrical connection between the topper screen and the gaming machine cabinet by connecting the topper electrical connector with the movable cabinet electrical connector. The display mounting system allows a single installer to assemble and mount the topper display to the gaming machine cabinet safely and without assistance.

18 Claims, 21 Drawing Sheets

(56) References Cited

U.S. PATENT DOCUMENTS

| | | | |
|---|---|---|---|
| 2016/0001188 A1 | 1/2016 | Kawashima | |
| 2019/0096170 A1* | 3/2019 | Lewis | G07F 17/3211 |
| 2019/0108711 A1 | 4/2019 | Pececnik | |

* cited by examiner

SYSTEM AND METHOD FOR MOUNTING A TOPPER SCREEN TO A GAMING MACHINE CABINET

RELATED APPLICATIONS

This application claims priority to U.S. Provisional Patent Application No. 63/301,714, filed on Jan. 21, 2022, the disclosure of which is hereby incorporated herein by reference in its entirety.

BACKGROUND

The present disclosure is generally directed to Electronic gaming machines ("EGMs"), and in particular to a mounting system for mounting a topper screen to the cabinet of an EGM.

A typical EGM may include a cabinet, a button deck, and one or more display screens mounted to, or disposed within, the cabinet. The EGM utilizes these components, in addition for example a graphical user interface, speakers, lights and/or other effects to engage players and enhance the gaming experience. A topper screen is a display screen that is attached to the uppermost portion of an EGM cabinet. A topper screen may be used to display graphics, video clips, and/or other effects associated with the EGM or gameplay of that EGM.

Mounting a conventional topper screen to an EGM cabinet was very cumbersome process, requiring multiple technicians. Conventional mounting systems required a first technician to hold the topper screen and mounting frame ("topper assembly") above the EGM cabinet while a second technician routed cables from the topper assembly through a hole on the top of the EGM cabinet. Subsequently, while the first technician continued to hold the topper assembly above the EGM cabinet, the second technician would guide the first technician to lower the topper assembly into its mounting position and would attach one or more fasteners to secure the topper assembly to the EGM cabinet. Only once the topper assembly was fully fastened to the EGM cabinet, could the first technician release the topper assembly.

Additionally, conventional topper assemblies required at least three or more cables to be routed from the topper assembly into the EGM cabinet. These cables would be used to carry power and electrical signals to various parts of the topper assembly, including the display monitor and/or an alert light positioned at the toper of the topper assembly. These cables often would connect to different connectors located at various positions within the EGM cabinet. Thus, since these cables connected at different locations, the cable lengths were also different. Moreover, traditionally a single topper assembly may be used with a variety of EGMs of different sizes and heights. Consequently, the cable length had to be optimized for the tallest EGMS cabinet, creating unnecessary slack and excess cable in shorter EGM cabinets. Thus, managing (i.e., tucking away) the excess cable slack required additional effort of the installer during installation.

EGMs or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Systems and methods for mounting a topper screen to a gaming machine are disclosed.

In particular, according to various embodiments, a display mounting system is disclosed. The system may include a topper mounting bracket. The topper mounting bracket may include an angled mounting plate fastened to an end of the topper mounting bracket, a topper electrical connector fastened to the angled mounting plate, and at least one mounting bolt fastened to and protruding perpendicularly from the angled mounting plate. The system may also include a cabinet frame, which includes an angled mounting surface comprising an interior and an exterior, a component receiving space positioned on the angled mounting surface, a cabinet electrical connector positioned on the interior of the angled mounting surface, and at least one key slot, positioned on the angled mounting surface. The topper mounting bracket may be operable to be mounted on the cabinet frame by engaging the at least one mounting bolt of the topper mounting bracket with the at least one key slot on the exterior of the angled mounting surface of the cabinet frame. The component receiving space of the cabinet frame may be operable to receive the topper electrical connector when the topper mounting bracket is mounted to the cabinet frame. engaging the topper electrical connector with the cabinet electrical connector establishes an electrical connection between the topper electrical connector and the cabinet electrical connector.

In some embodiments, the at least one key slot may include an upper larger diameter portion and a lower smaller diameter portion. In such an embodiment, the topper mounting bracket may be operable to be mounted on the cabinet frame by inserting the at least one mounting bolt of the topper mounting bracket into the upper larger diameter portion of the key slot and subsequently lowering the topper mounting bracket thereby sliding the at least one mounting bolt of the topper mounting bracket into the lower smaller diameter portion of the key slot to secure the topper mounting bracket. In another embodiment, the angled mounting plate of the topper mounting bracket and the angled mounting surface of the cabinet frame may be parallel. In a further embodiment, the angled mounting plate may have an angle between 30 and 60 degrees. In other embodiments, the cabinet electrical connector may include a movable cabinet electrical connector moveably coupled to the interior of the angled mounting surface of the cabinet frame. In such an embodiment, the topper electrical connector may be aligned along a same plane with the movable cabinet electrical connector when the topper mounting bracket is mounted to the cabinet frame such that sliding the movable cabinet electrical connector along the same plane towards the topper electrical connector establishes an electrical connection.

According to another embodiment, the topper electrical connector may be mounted on a cantilevered portion which extends perpendicularly from the angled mounting plate of the topper mounting bracket such that the topper electrical connector is positioned in a plane parallel to the angled mounting plate. Additionally, the movable cabinet electrical connector may be mounted on a movable connector bracket. The movable connector bracket may include a cantilevered portion which extends perpendicularly from the interior of the angled mounting surface of the cabinet frame, such that the movable cabinet electrical connector is positioned in a plane parallel to the angled mounting surface of the cabinet frame. In a further embodiment the at least one mounting bolt may be four mounting bolts, spaced adjacent a periphery of the angled mounting plate. Additionally, the at least one key slot may be four key slots spaced to align respectively with the four mounting bolts when the topper mounting bracket is mounted to the cabinet frame.

According to additional embodiments, a gaming machine is disclosed. The gaming machine may include a gaming machine cabinet. The gaming machine cabinet may enclose a game controller, a processor, and memory. The gaming machine may also include a main display mounted to the gaming machine cabinet, a topper screen, and a topper assembly. The topper assembly may be operable to mount the topper screen to the gaming machine cabinet above main display, and includes a topper mounting bracket operable to fasten to and support the topper screen at a first end, the topper mounting bracket comprising, an angled mounting plate fastened to a second end of the topper mounting bracket, a topper electrical connector fastened to the angled mounting plate, and at least one mounting bolt fastened to and protruding perpendicularly from the angled mounting plate. The gaming machine cabinet may include a cabinet frame, which includes an angled mounting surface comprising an interior and an exterior, a component receiving space positioned on the angled mounting surface, a cabinet electrical connector positioned on the interior of the angled mounting surface, and at least one key slot positioned on the angled mounting surface. The topper mounting bracket may be operable to be mounted on the cabinet frame by engaging the at least one mounting bolt of the topper mounting bracket with the at least one key slot on the exterior of the angled mounting surface of the cabinet frame. The component receiving space of the cabinet frame may be operable to receive the topper electrical connector when the topper mounting bracket is mounted to the cabinet frame. Engaging the topper electrical connector with the cabinet electrical connector may establish an electrical connection between the topper screen and the processor.

In some embodiments, the at least one key slot comprises an upper larger diameter portion and a lower smaller diameter portion, and wherein the topper mounting bracket is operable to be mounted on the cabinet frame by inserting the at least one mounting bolt of the topper mounting bracket into the upper larger diameter portion of the key slot and subsequently lowering the topper mounting bracket thereby sliding the at least one mounting bolt of the topper mounting bracket into the lower smaller diameter portion of the key slot to secure the topper mounting bracket and topper screen. In further embodiments, the angled mounting plate of the topper mounting bracket and the angled mounting surface of the cabinet frame may be parallel. In some embodiments, the angled mounting plate may have an angle between 30 and 60 degrees. In additional embodiments, the cabinet electrical connector may include a movable cabinet electrical connector moveably coupled to the interior of the angled mounting surface of the cabinet frame. In such an embodiment the topper electrical connector may be aligned along a same plane with the movable cabinet electrical connector when the topper mounting bracket is mounted to the cabinet frame such that sliding the movable cabinet electrical connector along the same plane towards the topper electrical connector establishes an electrical connection.

According to another embodiment the topper electrical connector may be mounted on a cantilevered portion which extends perpendicularly from the angled mounting plate of the topper mounting bracket such that the topper electrical connector is positioned in a plane parallel to the angled mounting plate. In such an embodiment, the movable cabinet electrical connector is mounted on a movable connector bracket. The movable connector bracket may include a cantilevered portion that extends perpendicularly from the interior of the angled mounting surface of the cabinet frame, such that the movable cabinet electrical connector is positioned in a plane parallel to the angled mounting surface of the cabinet frame. In another embodiment, the at least one mounting bolt may be four mounting bolts, spaced adjacent a periphery of the angled mounting plate. Additionally, the at least one key slot may be four key slots spaced to align respectively with the four mounting bolts when the topper mounting bracket is mounted to the cabinet frame.

According to additional embodiments, a display mounting system is disclosed. The display mounting system may include a topper mounting bracket, which includes an angled mounting plate fastened to an end of the topper mounting bracket and at least one mounting bolt fastened to and protruding perpendicularly from the angled mounting plate. The display mounting system may also include a cabinet frame, which includes an angled mounting surface and at least one key slot, comprising an upper larger diameter portion and a lower smaller diameter portion, positioned on the angled mounting surface. The topper mounting bracket may be operable to be mounted on the cabinet frame by inserting the at least one mounting bolt of the topper mounting bracket into the upper larger diameter portion of the key slot and subsequently lowering the topper mounting bracket thereby sliding the at least one mounting bolt of the topper mounting bracket into the lower smaller diameter portion of the key slot and thereby securing the topper mounting bracket.

In some embodiments, the angled mounting plate of the topper mounting bracket and the angled mounting surface of the cabinet frame may be parallel. In another embodiment, the angled mounting plate may have an angle between 30 and 60 degrees. In further embodiments, the at least one mounting bolt may be four mounting bolts, spaced adjacent a periphery of the angled mounting plate. Additionally, the at least one key slot may be four key slots spaced to align respectively with the four mounting bolts when the topper mounting bracket is mounted to the cabinet frame.

According to additional embodiments, a method for mounting a topper screen to a gaming machine cabinet is disclosed. The gaming machine cabinet may include a cabinet frame, a game controller, a processor, and memory. According to the method, one step may include fastening the topper screen to a first end of a topper mounting bracket, the topper mounting bracket comprising an angled mounting plate fastened to a second end of the topper mounting bracket and at least one mounting bolt fastened to and protruding perpendicularly from the angled mounting plate. Another step may include fastening a topper electrical connector to the angled mounting plate. Another step may include coupling a movable cabinet electrical connector to an interior of an angled mounting surface of the cabinet frame; the angled mounting surface comprising a component receiving space and at least one key slot, the at least one key slot comprising a larger diameter portion and a smaller diameter portion. Another step may include inserting the topper electrical connector through a component receiving space positioned on the angled mounting surface of the cabinet frame. Another step may include aligning and inserting the at least one mounting bolt of the topper mounting bracket into the larger diameter portion of the at least one key slot of the cabinet frame. Another step may include sliding the at least one mounting bolt of the topper mounting bracket into the smaller diameter portion of the at least one key slot of the cabinet frame, thereby securing the topper mounting bracket to the cabinet frame and aligning the topper electrical connector with the movable cabinet electrical connector. Another step may include tightening a mounting nut on the at least one mounting bolt, thereby fixing a position of the topper mounting bracket relative to the cabinet frame. Another step may include sliding the movable cabinet electrical connector towards the topper electrical connector to connect the movable cabinet electrical connector with the topper electrical connector, thereby establishing an electrical connection between the topper screen and the processor. Another step may include tightening at least one bracket nut on the movable cabinet electrical connector, thereby fixing a position of the movable cabinet electrical connector relative to the topper electrical connector.

In another embodiment, the method may include the at least one mounting bolt may be four mounting bolts, spaced adjacent a periphery of the angled mounting plate, and the at least one key slot may be four key slots spaced to align respectively with the four mounting bolts when the topper mounting bracket is mounted to the cabinet frame, and the method may further include the step of aligning and inserting the four mounting bolts of the topper mounting bracket respectively into the four key slots of the cabinet frame. In such an embodiment another step may include sliding the four mounting bolts of the topper mounting bracket respectively into the smaller diameter portion of the four key slot of the cabinet frame. Another step may include tightening the mounting nut respectively on each of the four mounting bolts.

Figure 1:
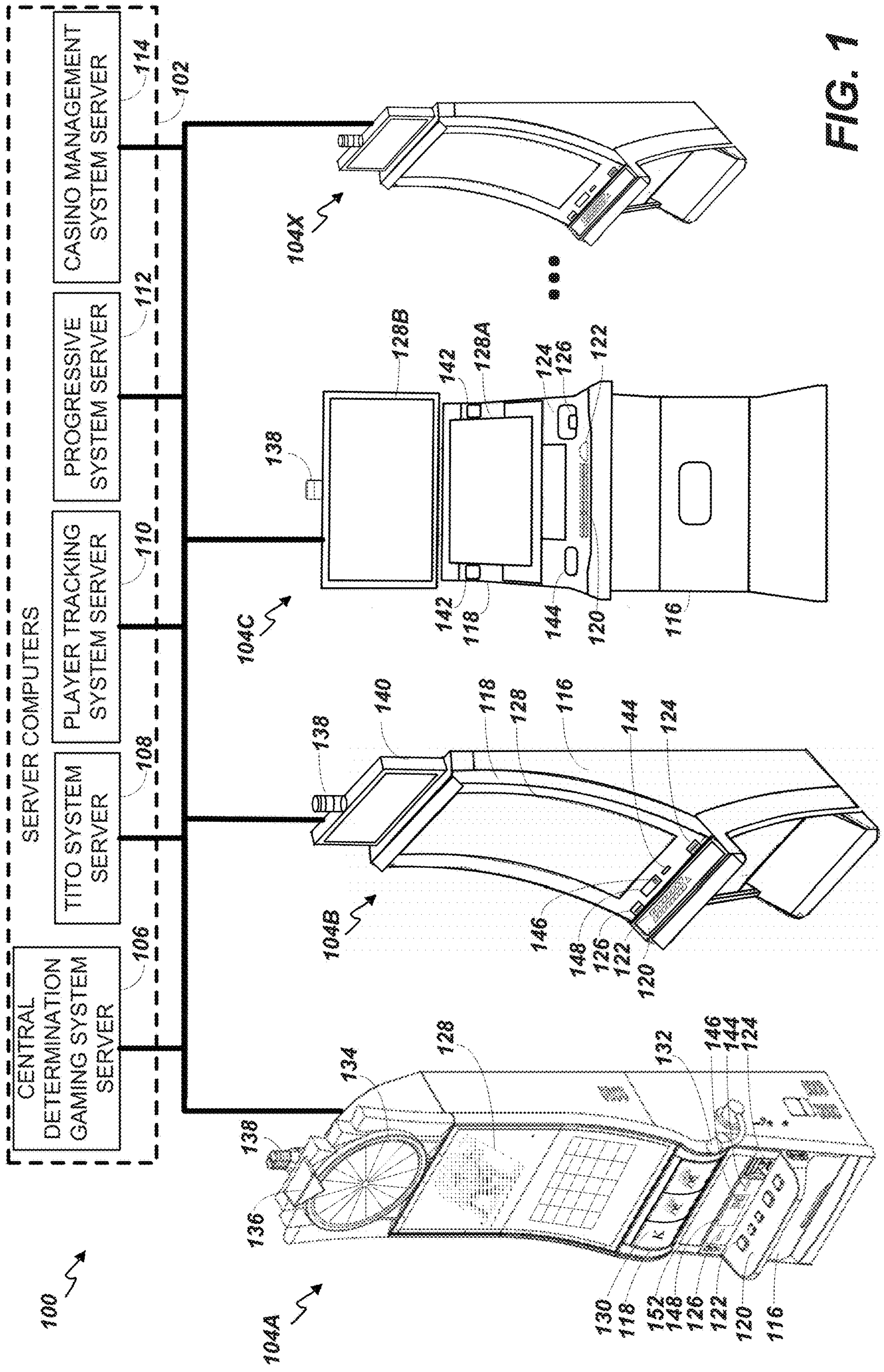
FIG. 1 is an exemplary diagram showing several EGMs networked with various gaming related servers.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. Specifically, embodiments of a topper mounting system are described herein. Conventional topper screens and methods of assembly present risk of damage to the equipment or injury to the technicians. As displays get heaver and larger, there is an increased need to eliminate conventional assembly techniques requirement a technician to hold the topper screen above head height and over the EGM cabinet. The topper display mounting system described herein eliminates this problem and reduces the effort required to install a topper screen on a gaming machine cabinet. The example embodiments of the present application disclose a topper display mounting system capable of being safely installed by a single technician. Specifically, disclosed is an exemplary system capable holding the topper screen and/or topper mounting bracket (collectively "topper assembly") in the installed positioned before being fully secured with fasteners to the EGM cabinet.

In some embodiments, the display mounting system allows for the secure mounting of a topper screen, including for example a large format liquid crystal display (LCD) or similar display screen, on the top of the EGM cabinet. In one embodiment the system utilizes a topper mounting bracket fastened to a topper screen (topper assembly) and a cabinet frame which is incorporated into or fastened to the EGM cabinet. The terms "fasten," or "fastening," or "fastened" may refer to being attached, affixed, constrained, or secured to prevent movement between the part being fastened and the object to which the part is fastened. This may be done using conventional fasteners such as screws, bolts, nuts, or otherwise to secure one or more parts. Alternatively, fastened may mean being secured by means of an adhesive, the use of magnets, or welding.

In such an embodiment, the angled mounting plate includes an angled mounting plate fastened to the topper mounting bracket, which includes one or more mounting bolts protruding perpendicularly from the angled mounting plate. The cabinet frame includes an angled surface which is designed to have the same angle as (i.e., be parallel with) the angled mounting plant when the topper mounting bracket is mounted and includes one or more key slots positioned to aligned with the one or more mounting bolts on the topper mounting bracket.

This exemplary system allows for a large and/or heavy topper assembly to be lifted into position by a single technician and engaged with the cabinet frame by engaging (e.g., inserting into an upper larger diameter portion of the keyhole and sliding into lower smaller diameter portion) the mounting bolt(s) into the key hole(s) on the cabinet frame. Doing so, secures (or constrains) the topper assembly to the cabinet. Once secured, the technician can continue with gaming machine installation without concern of the topper falling or becoming unstable. For example, once the topper assembly is secured, the technician can complete the installation by moving to the front of the open EGM and securing the topper mounting bracket by tightening one or more nuts the mounting bolt(s) now located within the interior of the EGM cabinet. Put differently, once the topper is positioned on the EGM cabinet it is self-supported. This is due to the combination of the angled mounting plate, mounting bolt(s), angled mounting surface, and key slot(s) distributing the weight of the topper assembly and utilizing gravity to constrain the topper assembly. As a result, the technician can complete the installation from the front of the EGM cabinet, thereby eliminating the need to access the sides and/or rear of the cabinet.

In some embodiments, all fasteners (e.g., nuts, locking pins, etc.) required to mount and permanently secure the topper assembly to the EGM cabinet may be internal fasteners located within the interior of the cabinet. Aside from the stated installation benefits above, the use of internal fasteners provides increased security when compared to conventional external topper assembly fasteners. By being positioned within the lockable cabinet enclosure, in order to remove the topper assembly one would first have to unlock the EGM cabinet. By contrast, topper assemblies installed with external fasteners are removable without first gaining authorized access to the interior of the EGM cabinet. Such an ability to loosen or remove the topper assembly may pose security and a safety risks to patrons interacting with the EGM.

Additionally, the present disclosure includes an exemplary system for greatly simplifying the wiring process of connecting the topper display to the EMG. For example, the system may include one or more electrical connectors instead of loose cables to establish an electrical connection between the topper display and the EGM. Specifically, all cables required to power and control the topper assembly may be routed through a topper electrical panel and joined into a single topper electrical connector. Similarly, all counterpart cables connected to the EGM may be routed through a cabinet electrical panel and joined in a single cabinet electrical connector. Thereby, all electrical connections required to power and control the topper assembly can be achieved solely by connecting the topper electrical connector with the cabinet electrical connector. Such a system completely eliminates the tedious task of threading the topper assembly cables into the EGM cabinet and individually connecting each cable. Additionally, The use of an electrical connectors provides increased flexibility to customize the shape of EGM cabinets without making any changes to the topper assembly as all required modifications in cable length and routing can be contained entirely within the EGM. Thus, the exemplary system described herein greatly reduces both the risk of the topper display falling during the installation process and the total installation time.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 ("gaming machine cabinet" or "cabinet") which may be used to initiate game play.

Figure 2A:
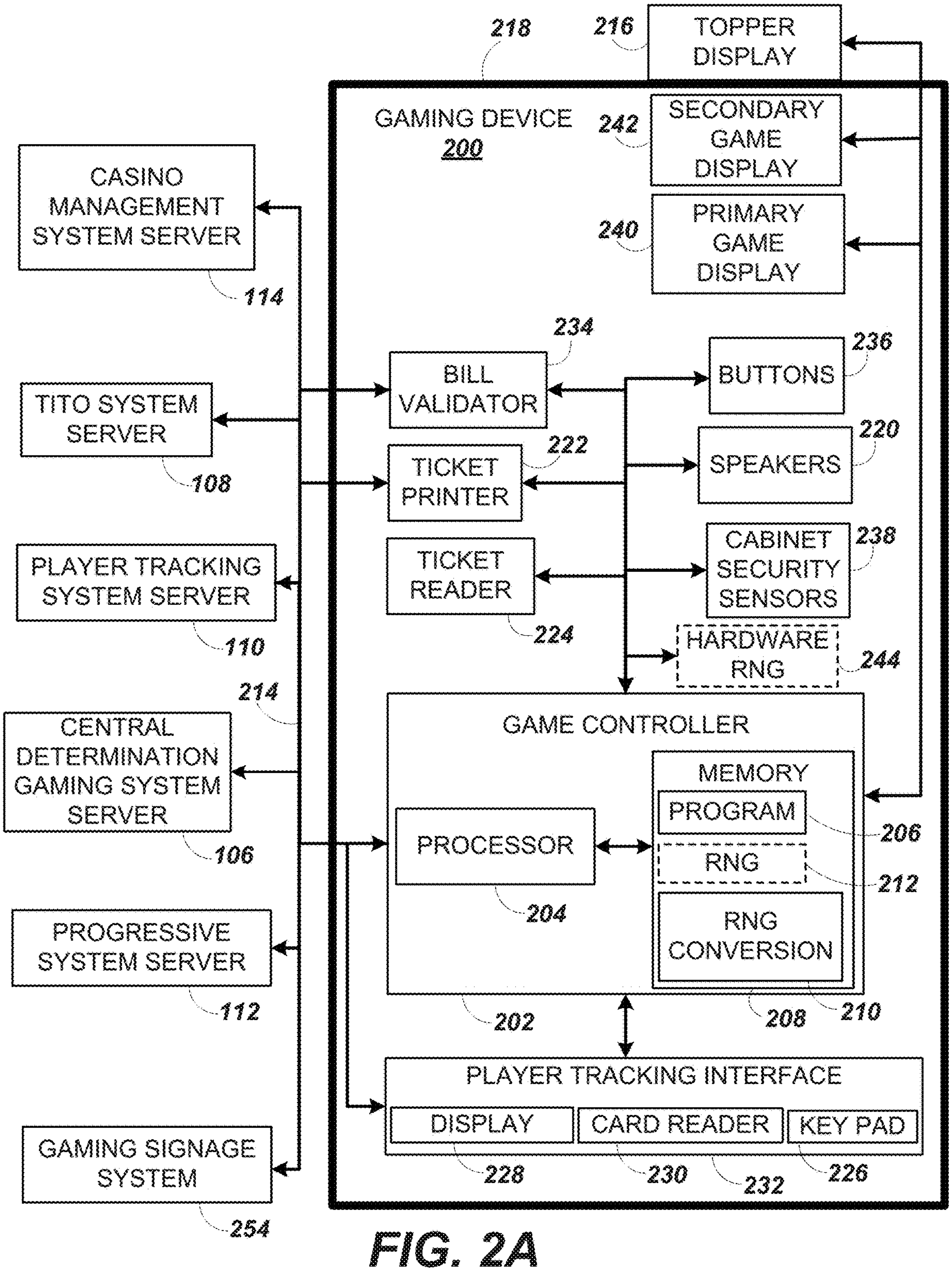
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
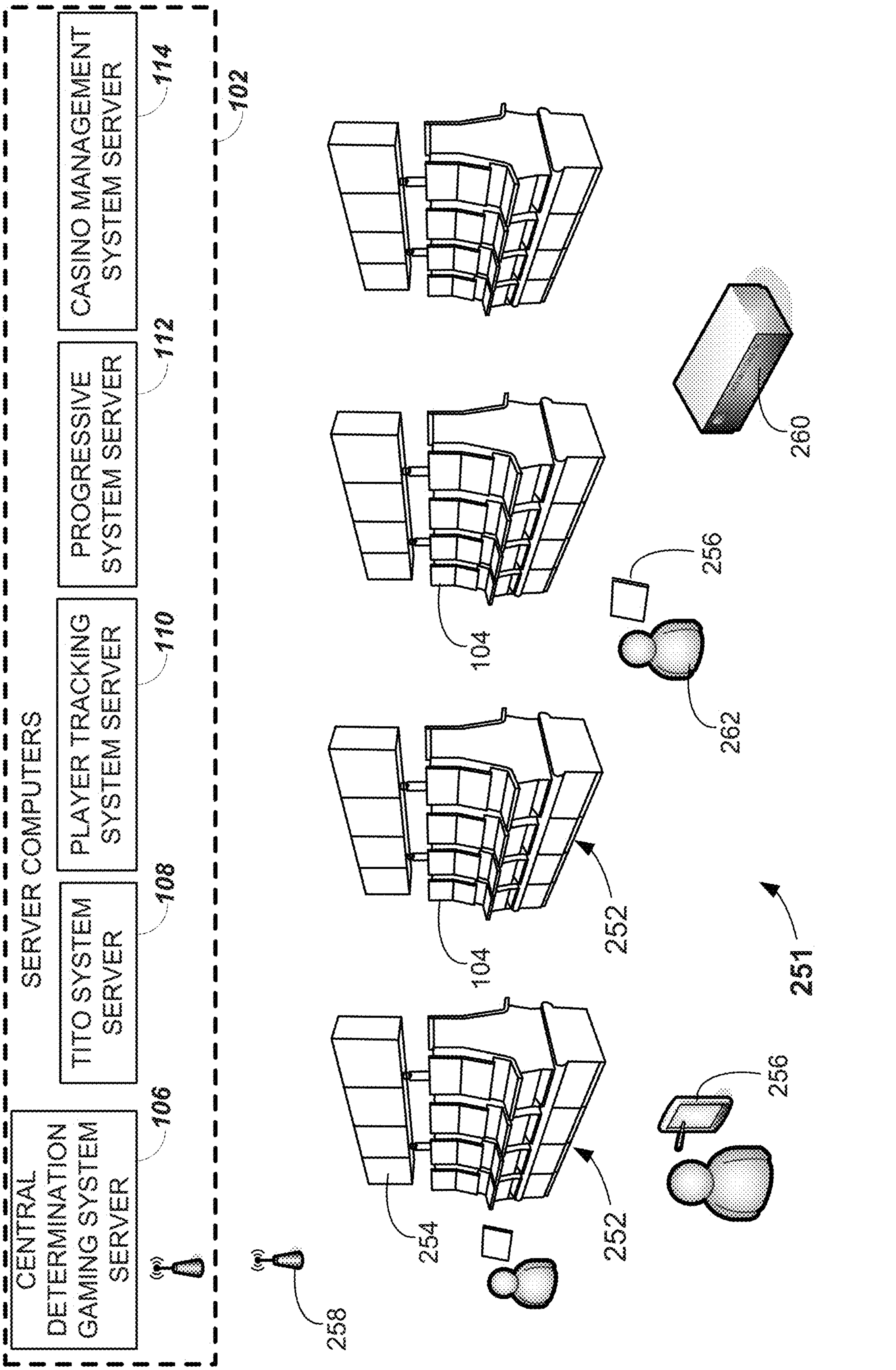
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a “cash out” signal to a kiosk 260 via a wireless link in response to receiving a “cash out” indication from a casino patron. The kiosk 260 may provide monetary credits to the casino patron 262 corresponding to the “cash out” signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron’s player loyalty card, a patron’s smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
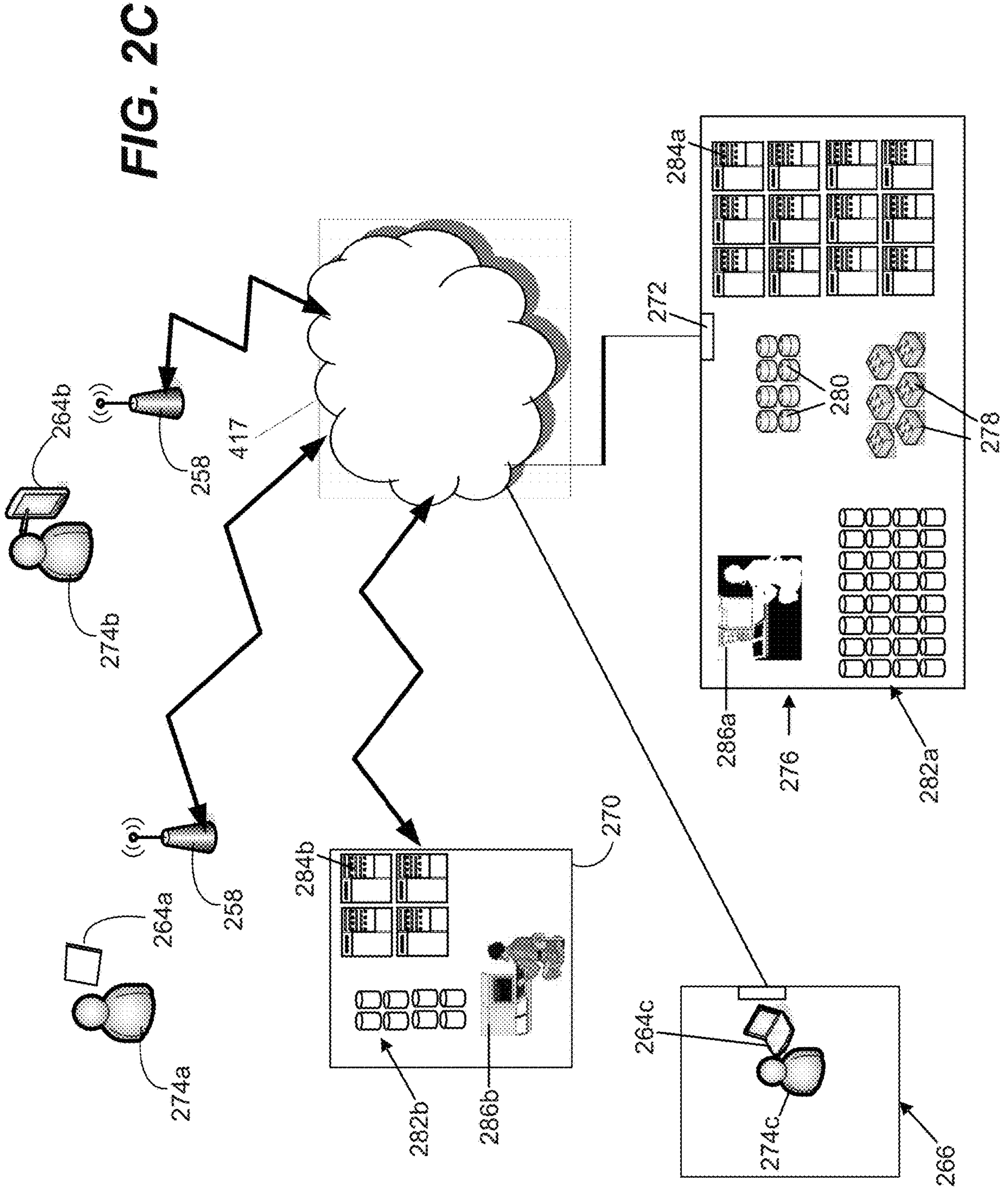
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player’s EUD. In other examples, code for executing at least some of the games may initially be stored on one or more of the servers

284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
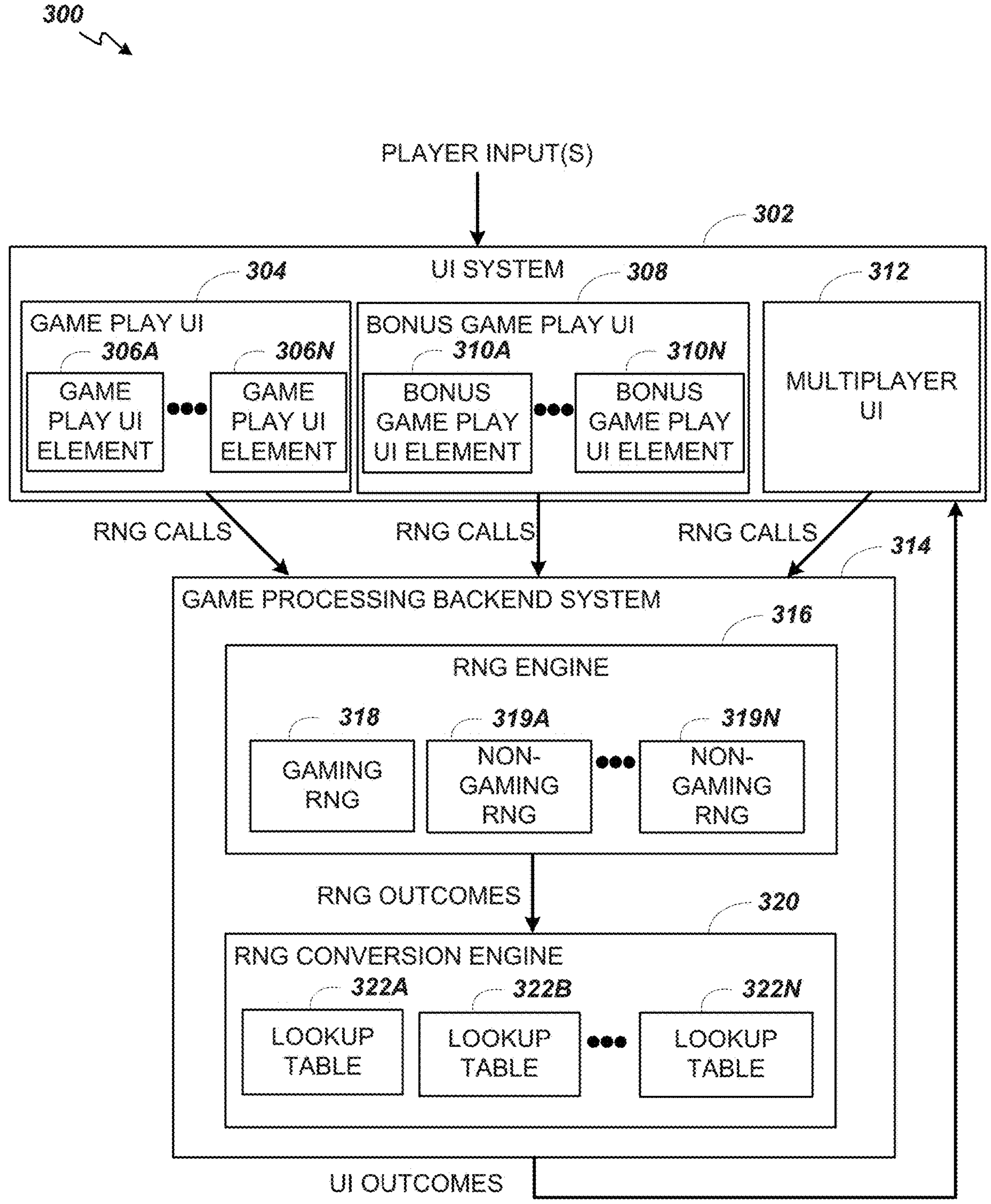
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
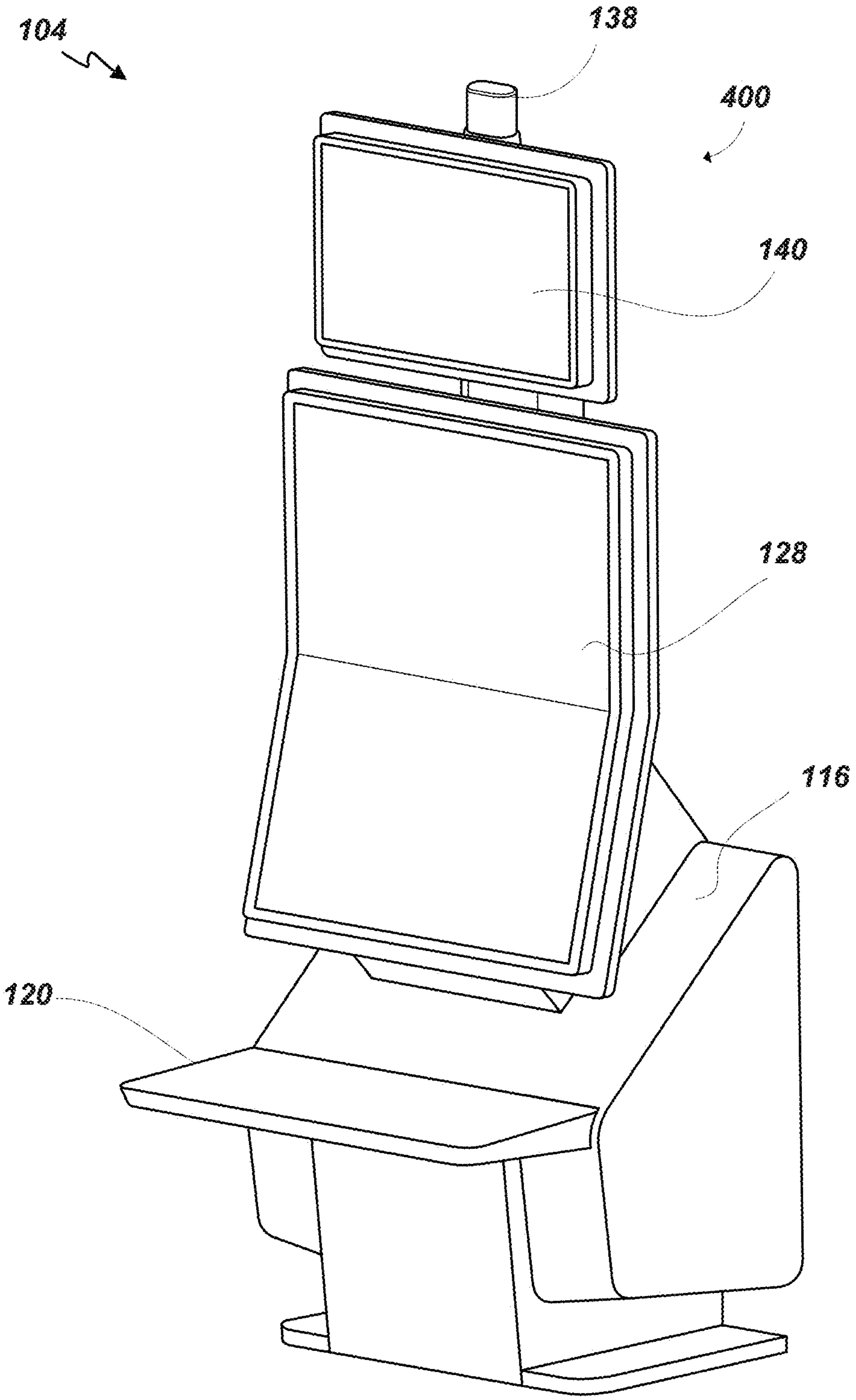
FIG. 4 is a perspective view of a gaming machine display mounting system in according to some aspects of the present disclosure.

FIG. 4 illustrates an exemplary electronic gaming machine 104 ("EGM") including a topper screen 140 mounted to a gaming machine cabinet 116 using a topper mounting system 400. The gaming machine 104 may include generally a main display 128 and a button deck 120, both positioned below the topper screen 140. The topper mounting system may also be utilized to position and connect a candle 138 (alert light) above the topper screen 140. It is understood that other arrangements of components within the EGM 104 are also contemplated. This includes EGMs 104 having smaller or larger topper screen(s) 140 and/or multiple EGMs 104 having a combined topper screen 140. The topper mounting system 400 disclosed herein, can be scaled up or down to accommodate various EGMs 104 (including banks of EMGs) and topper screens 140.

Figure 5:
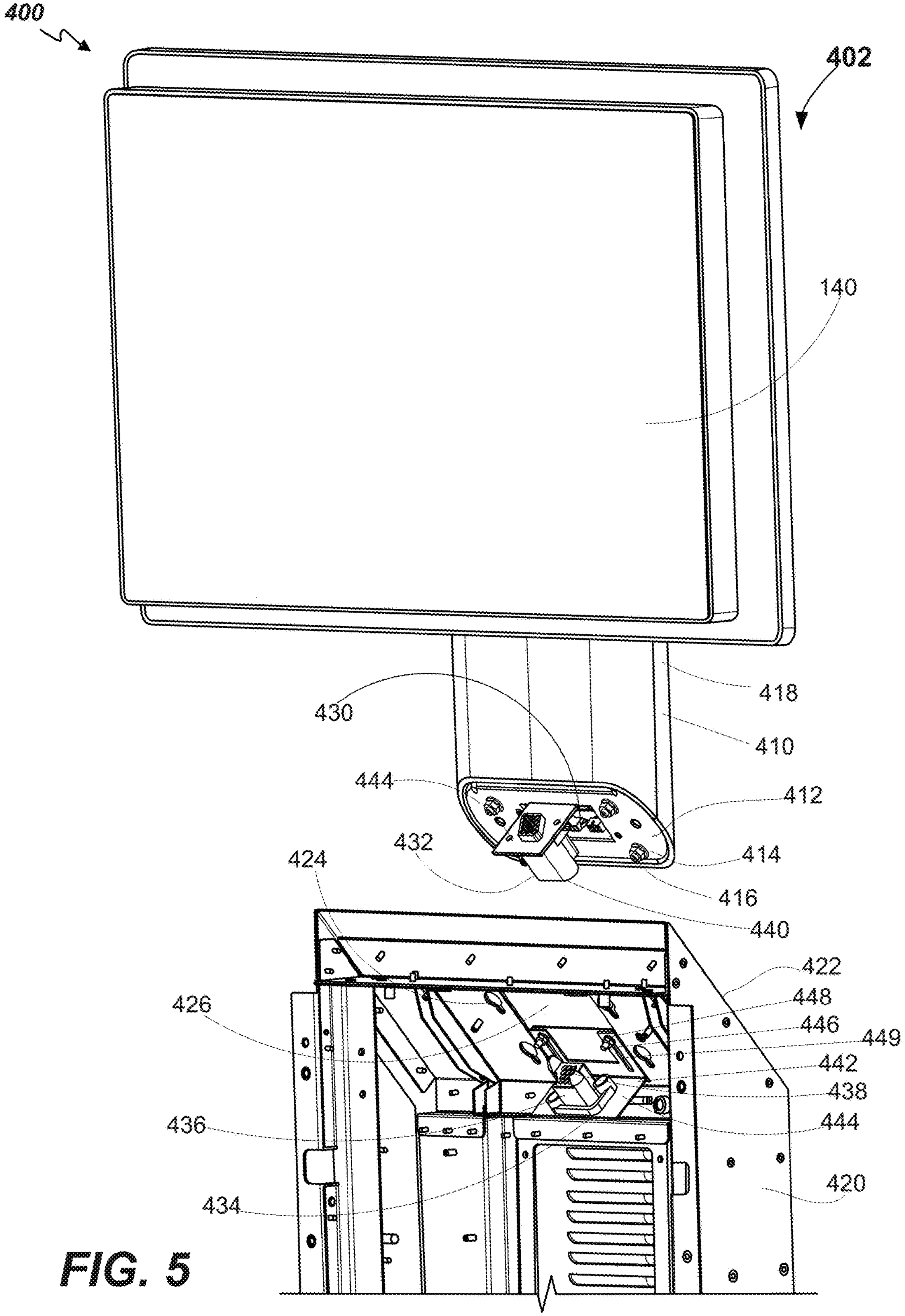
FIG. 5 is a detail perspective view of the top of a gaming machine, showing the display mounting system and the display detached from gaming machine according to some aspects of the present disclosure.
Figure 6:
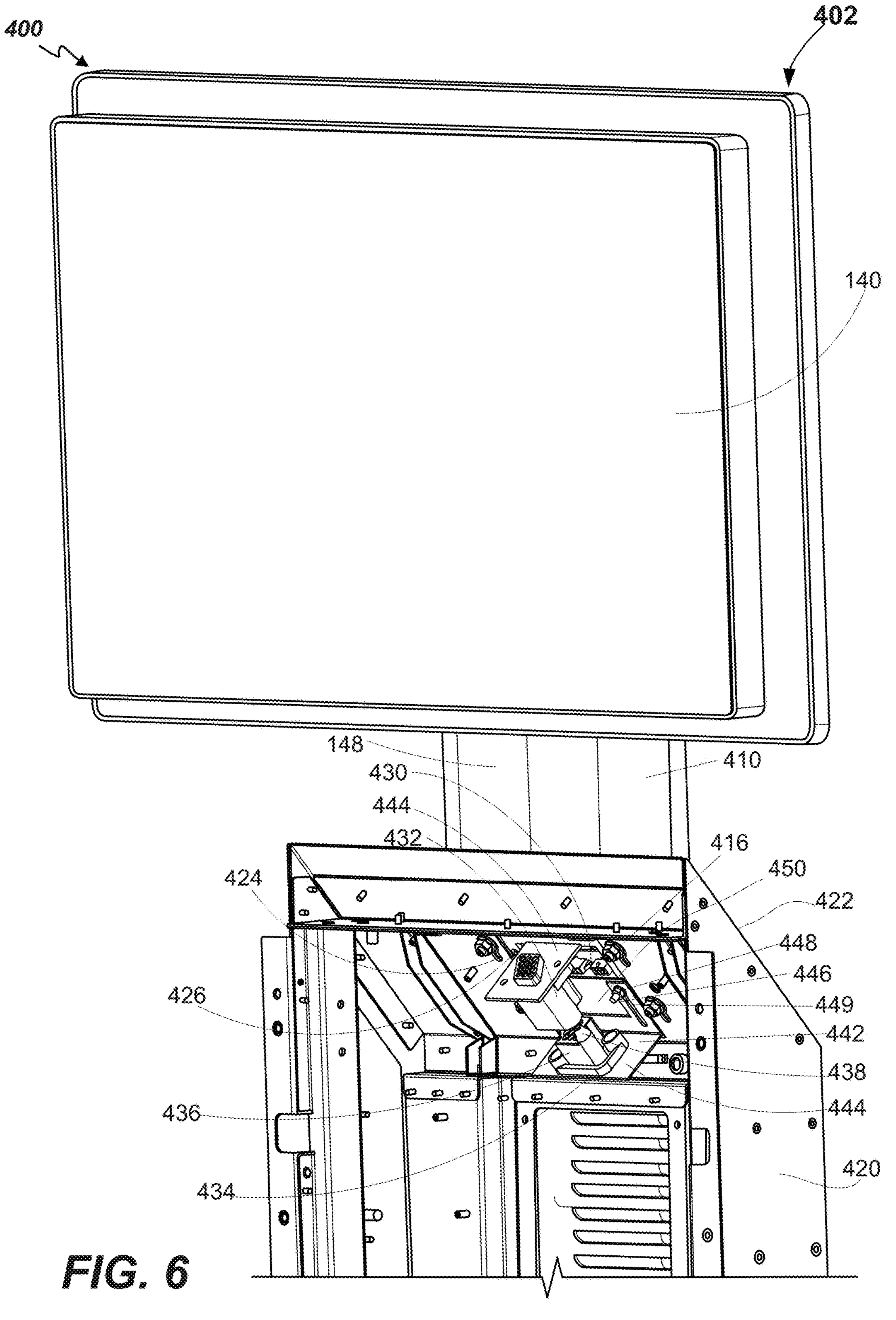
FIG. 6 is a detail perspective view of the top of a gaming machine, showing the display mounting system and the display attached to the gaming machine according to some aspects of the present disclosure.
Figure 7:
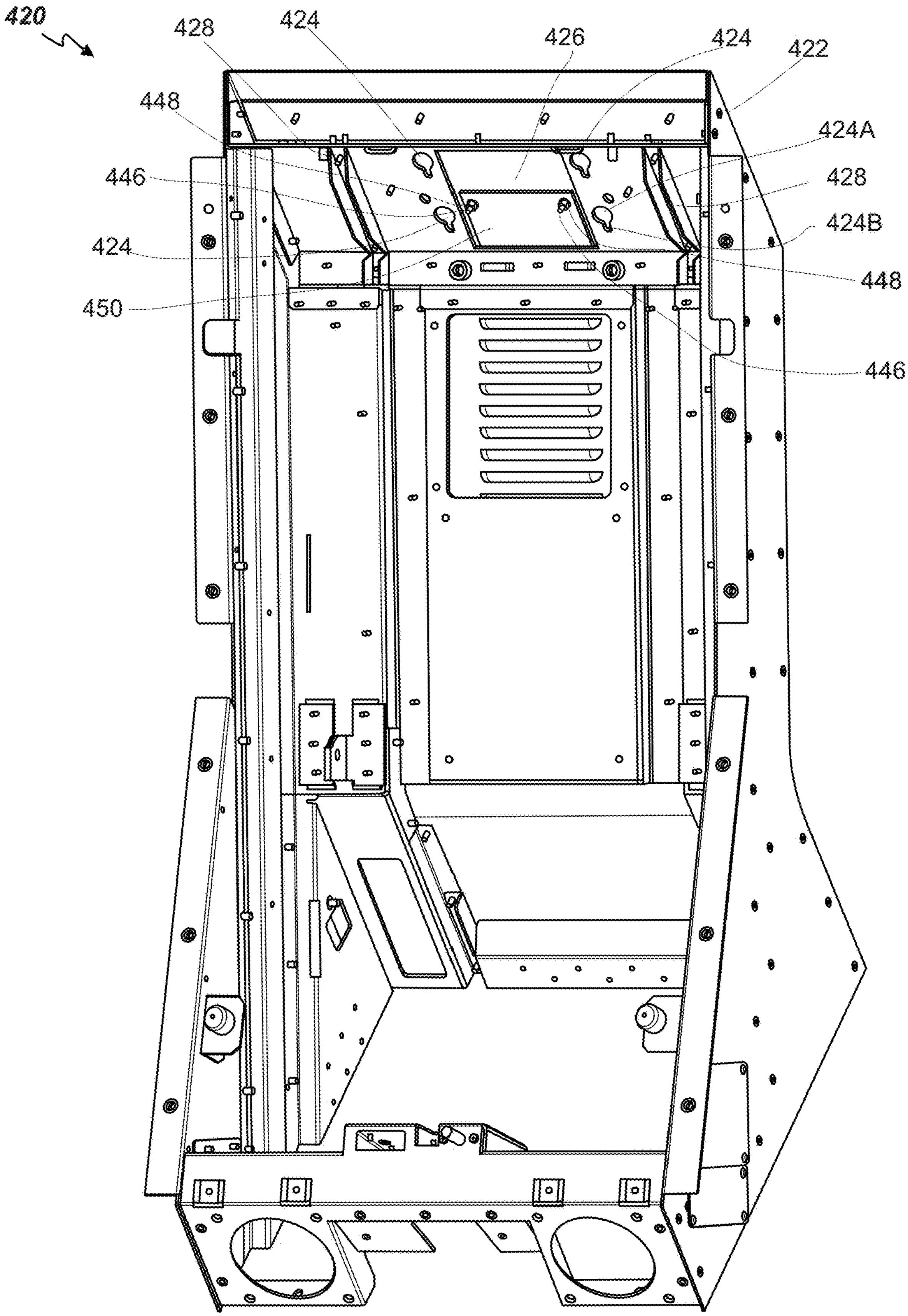
FIG. 7 is a perspective view of a cabinet frame of the gaming machine display mount system in accordance with some aspects of the present disclosure.
Figure 8:
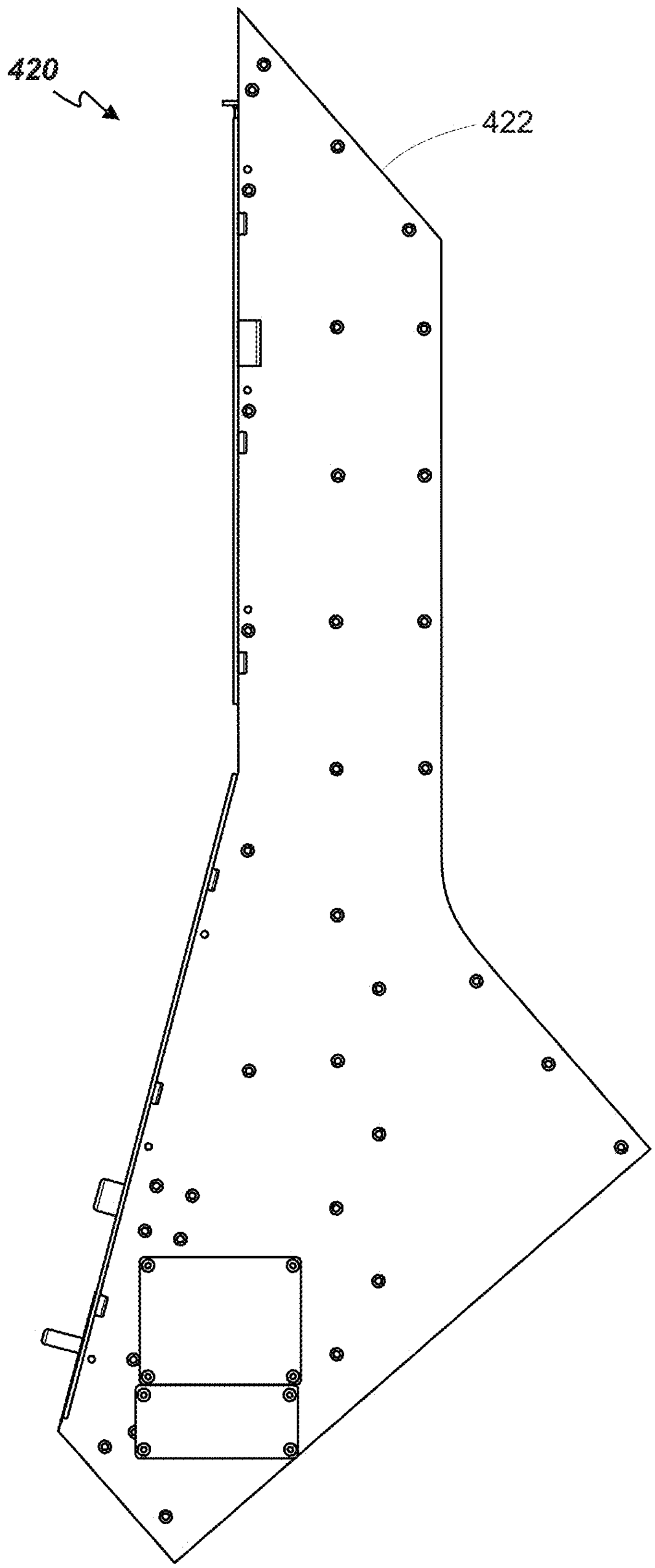
FIG. 8 is a side elevation view of a cabinet frame of the gaming machine display mount system in accordance with some aspects of the present disclosure.
Figure 9:
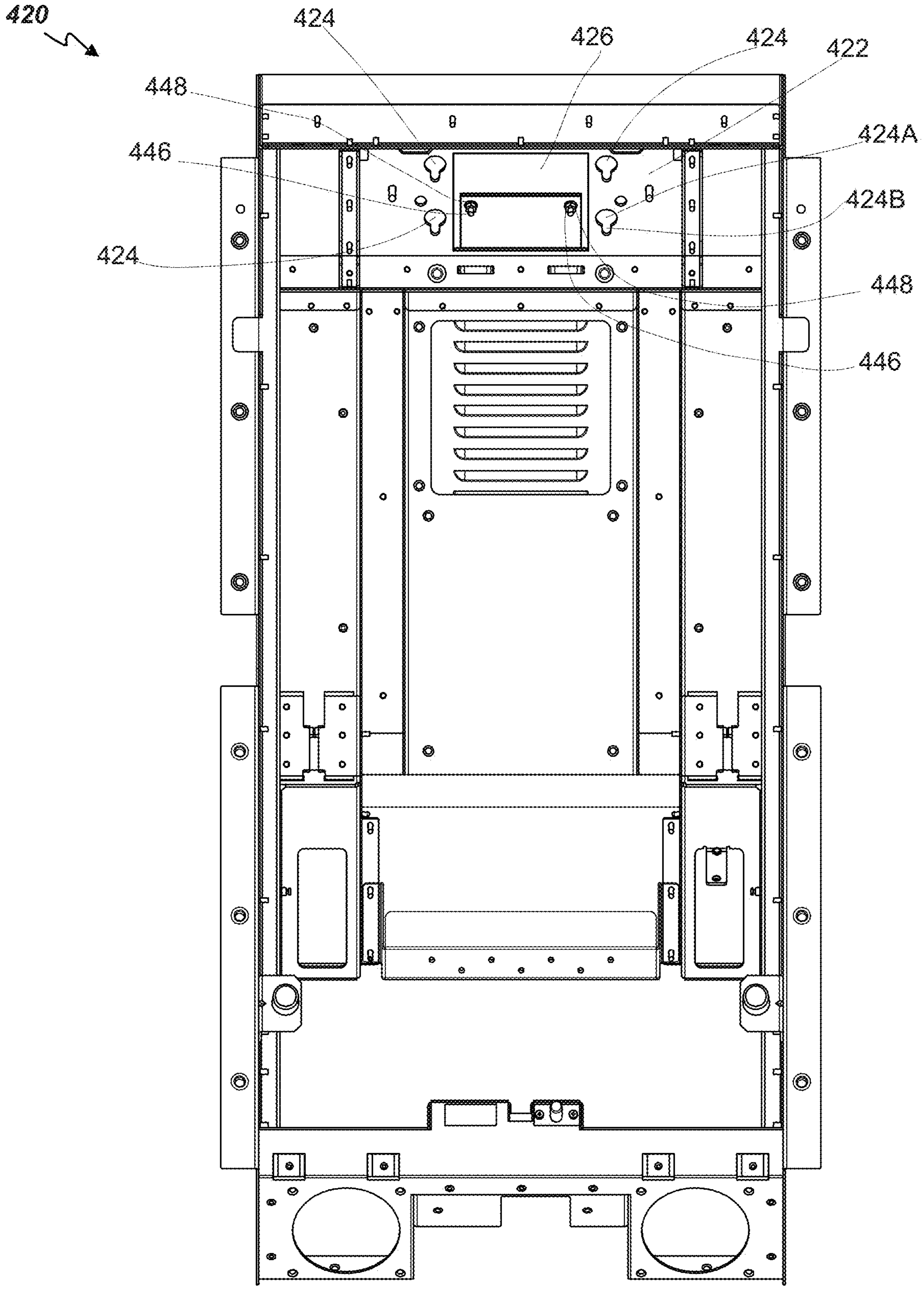
FIG. 9 is a front elevation view of a cabinet frame of the gaming machine display mount system in accordance with some aspects of the present disclosure.
Figure 10:
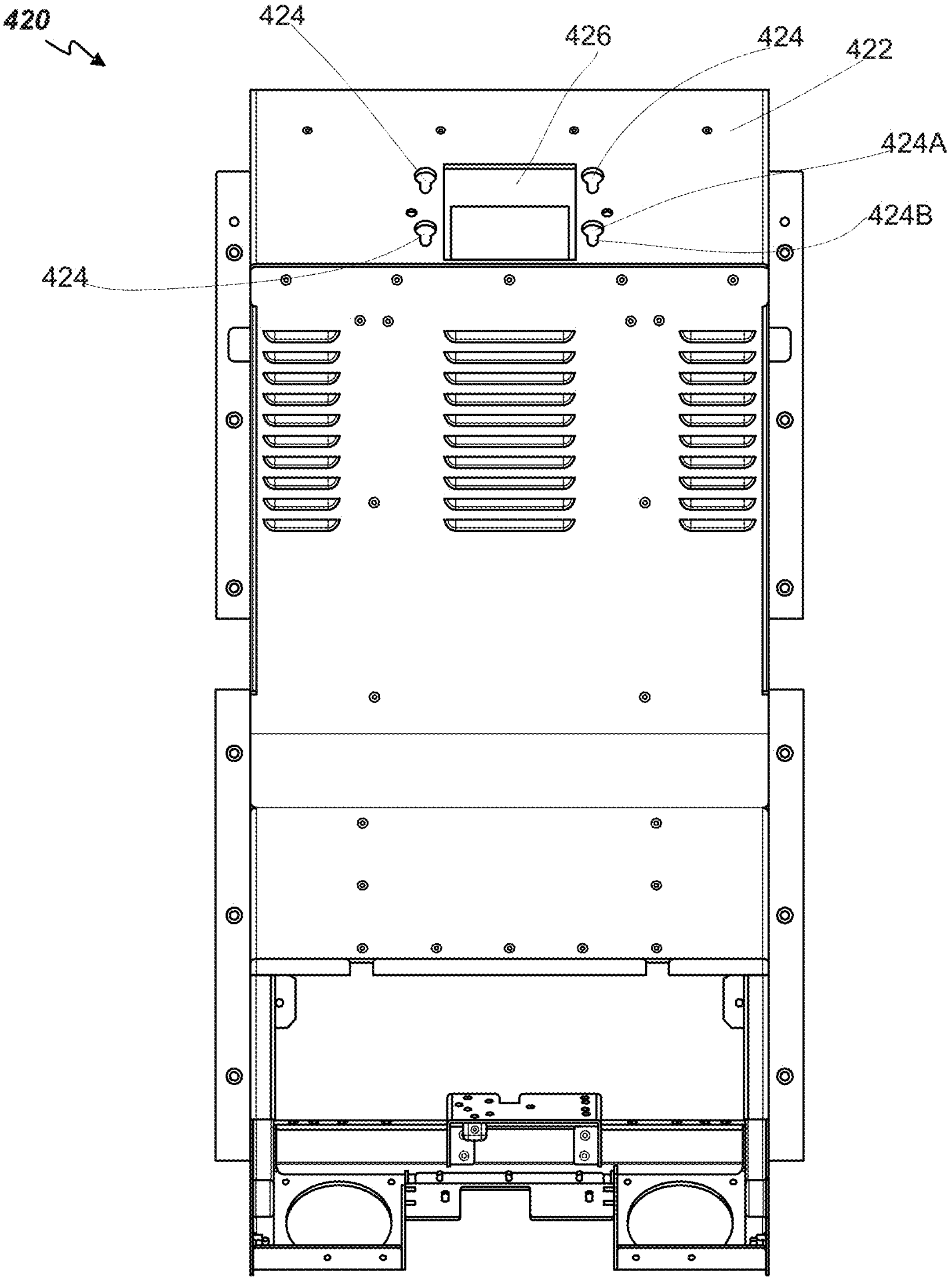
FIG. 10 is a rear elevation view of a cabinet frame of the gaming machine display mount system in accordance with some aspects of the present disclosure.

FIGS. 5 and 6 illustrate a topper mounting system 400 for an EGM 104 in accordance with certain aspects of the present disclosure. The topper mounting system may include for example a topper assembly 402, which attaches to the main cabinet 116. More specifically, the topper assembly 402 may include a topper screen 140 and a topper mounting bracket 410. The topper mounting bracket 410 may fasten directly or indirectly to the topper screen 140 at one end and fasten directly or indirectly to a cabinet frame 420 at another end. The present disclosure contemplates various shaped topper mounting bracket(s) 410. For example, the height may be larger or smaller as shown in the exemplary figures. Additionally, the present disclosure contemplates topper mounting brackets 410 that are height adjustable. The present disclosure also contemplates various ways to manufacture a topper mounting bracket 410. For example, the topper mounting bracket 410 may be formed from a single piece of material (including but not limited to metals, plastics, or other polymers). Alternatively, the topper mounting bracket 410 could include an internal frame (not shown) and be enclosed in bracket enclosure 418. The bracket enclosure 418 could be constructed of any suitable material (including but not limited to metals, plastics, or other polymers) and be made up of a single or multiple components.

The topper mounting bracket 410 may include an angled mounting plate 412 connected to or fastened at one end. An exemplary angle of the angled mounting plate 412 may be 45 degrees from a horizontal plane. The present disclosure also contemplates angled mounting plate(s) 412 having other angles based on the specific application of the topper mounting bracket 410. For example, the angle of the angled mounting plate 412 could range anywhere between 0 and 90 degrees, but preferably between 30 and 60 degrees, from a horizontal plane. The present disclosure also contemplates an adjustable angled mounting plate 412 coupled to a pivoting mechanism (not shown) to allow a technician to alter the specific angle required per the specific installation. The angled mounting plate 412 may have a variety of different shapes, including but not limited to, pill shaped (shown), oval, round, square, rectangular, or other. It is understood that the exact shape of the angled mounting plate 412 is determined by the shape of the topper mounting bracket 410 and/or bracket enclosure 418.

Likewise, the cabinet frame 420 may include an angled mounting surface 422. The angled mounting surface 422 includes an interior side, accessible only from the inside of the cabinet 116, and an exterior side. The angled mounting plate 412 may be fastened to the angled mounting surface 422 of the cabinet frame 420 to mount the topper assembly 402 to the EGM cabinet 116. In a preferred embodiment, the angled mounting plate 412 may have the same angle as an angled mounting surface 422 on the cabinet frame 420 (e.g. 45 degrees from a horizontal plane). Having the angle of the angled mounting plate 412 and the angled mounting surface 422 be the same may contribute to an even load distribution of the weight of the topper assembly 402 when it is mounted to or attached to the cabinet frame 420. The present disclosure also contemplates alternative embodiments in which the angled mounting plate 412 and the angled mounting surface 422 do not have the same angle. For example in one embodiment, the angled mounting plate may have an angle of 60 degrees from a horizontal plane and the angled mounting surface may have an angle of 30 degrees from a horizontal plane. The present disclosure contemplates all combinations of angles that that would add up to 90 degrees from a horizontal plane such that the angled mounting plate 412 and angled mounting surface 422 would be parallel in the installed position. The angled mounting surface 422 may also be adjustable. For example, the angled mounting surface may be coupled to the cabinet frame 420 by a pivoting mechanism, enabling the angled mounting surface 422 to be positioned at various angles.

In one exemplary embodiment, the angled mounting plate 412 is the primary attachment point of all components required to fasten and connect the topper screen 140 to the EGM 104, and specifically, the angled mounting surface 422 of cabinet frame 420. For example, the angled mounting plate 412 may have one or more mounting bolt(s) 414 fastened to and extending perpendicularly from the angled mounting plate 412. The mounting bolt(s) 414 may be welded directly on to the angled mounting plate 412 or inserted through and fastened to the angled mounting plate 412 using any conventional fastener. In one embodiment, there are four mounting bolts 414 fastened to and extending perpendicularly from the angled mounting plate 412. In such an embodiment, the mounting bolts 414 may be positioned in a rectangular pattern and adjacent the periphery of the angled mounting plate 412. The mounting bolts may include one or more topper mounting nut(s) 416. The mounting nut(s) 416 may be any type of nut, including but not limited to, a hex nut, nylon insert lock nut, jam nut, or flange nut. The mounting nut(s) 416 may be used to fasten the topper assembly 402 to the cabinet frame 420. The present disclosure also contemplates the use of multiple mounting nuts 416 threaded onto the same mounting bolt 414, to lock the position of the mounting nuts 416. In the installation configuration, the mounting nut(s) 416 should be threaded onto the mounting bolt(s) 414 loosely, such that there is a gap being the mounting nut(s) and between the angled mounting plate 412 that is at least as wide as the width of the angled mounting surface 422 (i.e., the width of the sheet metal used to from the cabinet frame 420).

In this same exemplary embodiment, the angled mounting surface 422 may also include one or more key slot(s) 424 cut into and through the angled mounting surface 422. The key slot(s) 424 may be positioned to align with the one or more mounting bolt(s) 414 when the topper assembly is mounted. For example, in one embodiment the angled mounting surface 422 may have four key slots 424 cut into it which are spaced the same height and width apart as the four mounting bolts 414 fasted to the angled mounting plate 412 of the topper mounting bracket 410. Thus, in such an embodiment the four key slots would have a rectangular arrangement. It is contemplated that other arrangements for the mounting bolts 414 and key slots 424 are also possible, for example but not limited to a square or trapezoidal Arrangements. It is also contemplated that fewer or greater than four mounting bolts 414 and key slots 424 may used.

The key slot(s) may have a larger diameter portion 424A and a smaller diameter portion 424B. In the exemplary embodiment, the larger diameter portion 424A is positioned generally above the smaller diameter portion 424B. The larger diameter portion 424A may have a diameter that is slightly larger than the overall diameter and width of the mounting nut(s) 416, such that a mounting bolt 414 having a topper mounting nut 416 nut threaded on it can be inserted through the larger diameter portion 424A of the key slot 424. By contrast, the smaller diameter portion 424B may have a diameter that is larger than the diameter of the mounting bolt(s) 414 but smaller than the diameter of the mounting nut(s) 416. In such a configuration, if the topper mounting bracket 410 and mounting bolt 414 with a threaded-on mounting nut 416 is inserted into the larger diameter portion 424A and then lowered into the smaller diameter portion 424B, the topper mounting bracket 410 cannot be removed (i.e., by pulling backwards) without first lifting the topper mounting bracket such that the mounting bolt 414 and mounting nut 416 are again positioned in the larger diameter portion 424A.

As shown in FIGS. 5 and 6, is an exemplary embodiment having four mountings bolts 414 and four key slots 424. In such an embodiment, the topper assembly 402 may be lowered such that the four mounting bolts 414 can be inserted into the four key slots 424, and specifically the larger diameter portion 424A. After the four mounting bolts 414 have each been inserted into each of their respective key slots 424 the topper assembly can be shifted slightly downward, such that the mounting bolts 414 sit in the smaller diameter portion 424B of the key slots 424. In such an embodiment, because the mounting bolts 414 each have a mounting nut 416 threaded onto it, the topper assembly 402 is secured to the cabinet frame 420 and cannot fall. More specifically, the weight of the topper assembly 402 is distributed evenly across the four main contact points (i.e., the four mounting bolts 414 sitting in the smaller diameter portion 424B of the key slot). Additionally, due to the angle of the angled mounting plate 412 and angled mounting surface 422, the weight of the topper assembly 402 is distributed over a larger area, thereby creating a more stable contact point and further constraining the topper assembly 402 to the cabinet frame 420. Additionally, in this exemplary embodiment, as long as the mounting nuts 416 are fully threaded onto the mounting bolt 414, the topper assembly 402 is secured to the cabinet frame 420 even before tightening the mounting nuts 416. This secure connection results from the large, four point, area of contact and the weight of the topper assembly 402 being evenly distributed and pushing the mounting bolts into the smaller diameter portion 424B of the key slots 424. Once the topper assembly 402 is seated as described above, a technician can move to the front side of the EGM 104 and finish the installation of the topper, for example by tightening the mounting nuts 416 and establishing an electrical connection between the topper screen 140 and the EGM 104. Thus, as described above, the present exemplary embodiment of the topper mounting system 400 ensures that a single technician can safely and efficiently mount the topper assembly 402 to the cabinet frame 420 of the cabinet 116.

The exemplary topper mounting system 400 may additionally and optionally include components to simplify the process of establishing an electrical connection between the topper screen 140 and the EGM 104. For example, the topper mounting system may include a topper electrical panel 430, a topper electrical connector 432, a cabinet electrical panel 434, and a cabinet electrical connector 436. The topper electrical connect 432 is configured to engage and/or couple with the cabinet electrical connector 436 to establish an electrical connection between the topper screen 140 and the EGM 104. In one example, the term "establishing an electrical connection" may refer to providing power and coupling the topper screen 140 to the game controller 202 and/or processor 204, such that the game controller 202 and/or processor 204 are able to send display signals thereby activating and controlling the topper screen.

The topper electrical panel 430 may act as a hub to join all of the cables and/or connections coming from the topper assembly 402, such that all connections may be combined into the single topper electrical connector 432. Likewise, the cabinet electrical panel 434 may act as a hub to join all of the cables and/or connections coming from within the EGM cabinet 116 (which are required to power and control the topper assembly 402), such that all connections may be combined in o the single cabinet electrical connector 436. The topper electrical connector 432 and the cabinet electrical may be free floating with the cabinet 116 or may be fastened to components that automatically align the respective connectors when the topper assembly 402 is mounted to the cabinet frame 420.

For example, the topper electrical connector 432 may be fasted to a cantilevered portion 444 extending perpendicularly from the angled mounting plate 412. In such an embodiment, when the topper electrical connector is fastened to the cantilevered portion 444, it is positioned in a plane parallel to the angled mounting plate 412. Similarly the cabinet electrical connector 436 may be fastened to a movable connector bracket 442 which is slideably or moveably coupled to the angled mounting surface 422. The term "movable" as used herein may refer to having the ability to move, slide, shift, or otherwise be repositioned. The movable connector bracket 442 may be an L-shaped bracket, or any other shape suitable to align the respective electrical connectors. In one exemplary embodiment, the movable connector bracket has a cantilevered portion 444 extending perpendicularly from both the movable connector bracket 442 and the angled mounting surface 422. The cabinet electrical connector 436 may be fastened to the cantilevered portion 444 of the movable connector bracket 442 so that it is positioned in a plane parallel to the angled mounting surface 422. The example movable connector bracket 442 may also include one or more bracket slot(s) 449. The bracket slot(s) 449 may have width sized to accommodate a bracket post 446 (e.g., a threaded post) welded or fastened and extending from a movable connector attachment plate 450 and/or angled mounting surface 422. The movable connector bracket 442 may be slideably or movably coupled to the movable connector attachment plate 450 and/or angled mounting surface 422 by positioning the bracket posts 446 within the bracket slots 449 and threading one or more bracket nut(s) 448 onto the bracket post 446. In such an exemplary embodiment, the movable connector bracket 442, and cabinet electrical connector 436, can slide along a plane parallel to the angled mounting surface.

The angled mounting surface 422 of the cabinet frame 420 may also include a component receiving space 426. The component receiving space may be positioned to receive the topper electrical connector 432 when the topper assembly is mounted to the cabinet frame 420. Alternatively, the component receiving space 426 may receive one or more cables (not shown) from the topper assembly 402. Thus, in the exemplary embodiment in which the angle of the angled mounting plate 412 and angled mounting surface 422 are the same (for example 45 degrees from a horizontal plane), the topper electrical connector 432 is aligned with the cabinet electrical connector 436 once the topper assembly 402 is mounted onto the cabinet frame 420, as shown for example in FIG. 6. It is noted that other embodiments in which the angles of the angled mounting plate 412 and angled mounting surface 422 are different are also contemplated. The above connector alignment is possible with any combination of angles so long as the angled mounting plate 412 and angled mounting surface 422 are parallel.

A technician may additionally be able to adjust the alignment of the topper electrical connector 432 relative to the cabinet electrical connector 436, and vice versa, by loosening, shifting, and tightening the respective connectors on the cantilevered portion(s) 444. For example, the cantilevered portion 444 may include one or more alignment slots (not shown) to assist in the alignment. The electrical connectors may additionally include on or more alignment guide(s) 438 configured to be received in an alignment hole 440. The alignment guide(s) 438 may include, for example, a generally conical shaped head. Thus, in one exemplary embodiment when the movable connector bracket 442 and cabinet electrical connector 436 are slid towards the topper electrical connector 432, the alignment guide 438 of one connector may engage with (i.e., be inserted into) the alignment hole 440 of the other connector and ensure that the connectors are aligned to establish an electrical connection. Alignment guide 438 may additionally, already be partially seated within the alignment hole 440 once the topper assembly 402 is mounted and secured to the cabinet frame 420. Once the cabinet electrical connector 436 is fully coupled and/or engaged with the topper electrical connector 432, a technician may lock the position of the movable connector bracket 442, and in-turn the cabinet electrical connector 436 by tightening the one or more bracket nut(s) on the bracket post(s). It is noted that the present disclosure also contemplates embodiments including one or more free floating or loosely coupled connectors. For example, in one alternative embodiment the topper electrical connector 432 may be fastened to the angled mounting plate 412 as described above, but the cabinet electrical connector 436 may simply be attached to a cable and be free floating (i.e., movable) within the cabinet 116.

FIGS. 7-10 show additional exemplary views of one embodiment of a cabinet frame 420. The cabinet frame 420 includes an angled mounting surface 422 ("angled surface") located on an upper portion of the cabinet frame 420. The angled surface 422 includes an interior side and an exterior side. The Angled surface may further include one or more reinforcement brace(s) 428 fastened to the interior side of the angled surface 422. The reinforcement brace(s) 428 may assist in increasing the structural rigidity of the angled surface 422. The exemplary cabinet frame 420 may also include one or more key slots 424 positioned centrally on the angled mounting surface, for example four key slots 424. The key slot(s) 424 may include a larger diameter portion 424A and a smaller diameter portion 424B, positioned generally lower than the larger diameter portion 424A. The exemplary cabinet frame 420 may additionally include a connector attachment plate 450. This connector attachment plate 450 may be an integral portion of the angled mounting surface 422 or alternatively a separate component fastened to the angled mounting surface 422. The connector attachment plate 450 may have the same fixed angle as the angled mounting surface 422. Alternatively, the connector attachment plate 450 may be coupled to a pivoting mechanism (not shown), such that the angle, relative to a horizontal plane, could be modified. Fastened to the connector attachment plate 450 may be one or more (threaded) bracket post(s) 446 and bracket nut(s) 448. In one embodiment, the bracket post 446 projects perpendicularly from the connector attachment plate and may be directly welded on to the connector attachment plate 450 or fastened to the connector attachment plate using any conventional fastener. The exemplary cabinet frame 420 may also include a component receiving space 426 for receiving, for example, a topper electrical connector 432 or one or more cables (not show) from the topper assembly 402.

Figure 11:
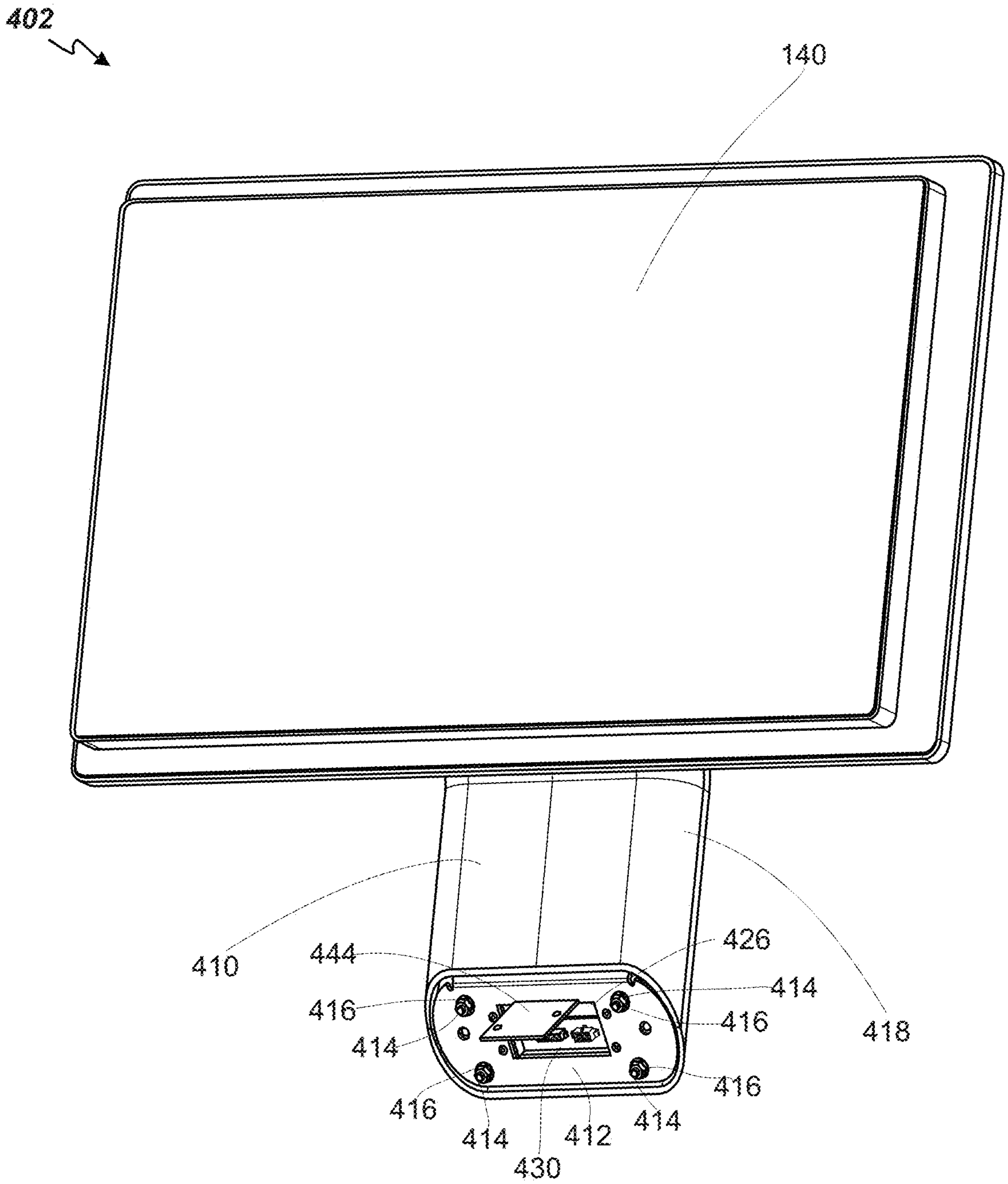
FIG. 11 is a perspective view of a topper screen and mounting bracket of the gaming machine display mount system in accordance with some aspects of the present disclosure.
Figure 12:
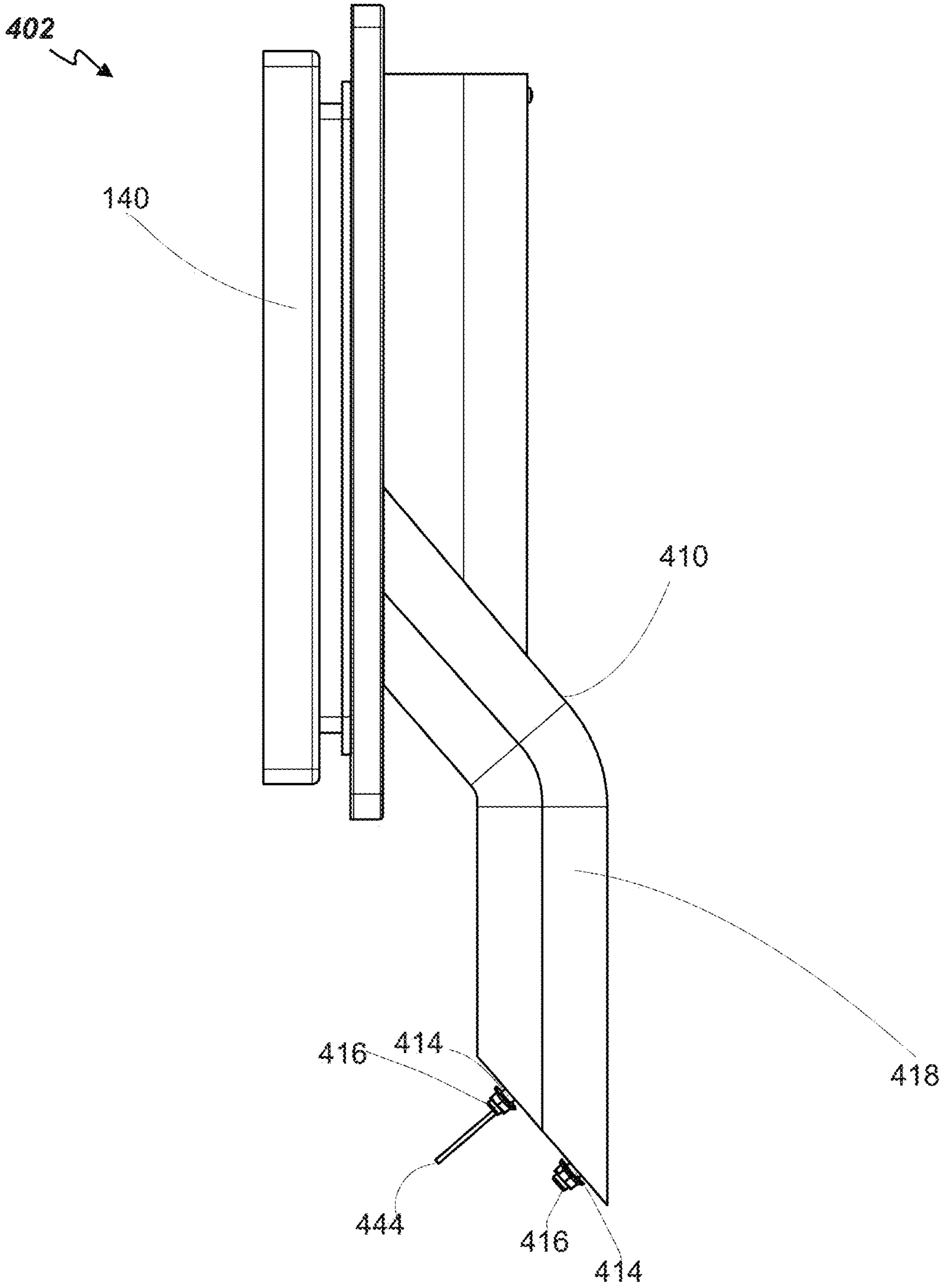
FIG. 12 is a side elevation view of a topper screen and mounting bracket of the gaming machine display mount system in accordance with some aspects of the present disclosure.
Figure 13:
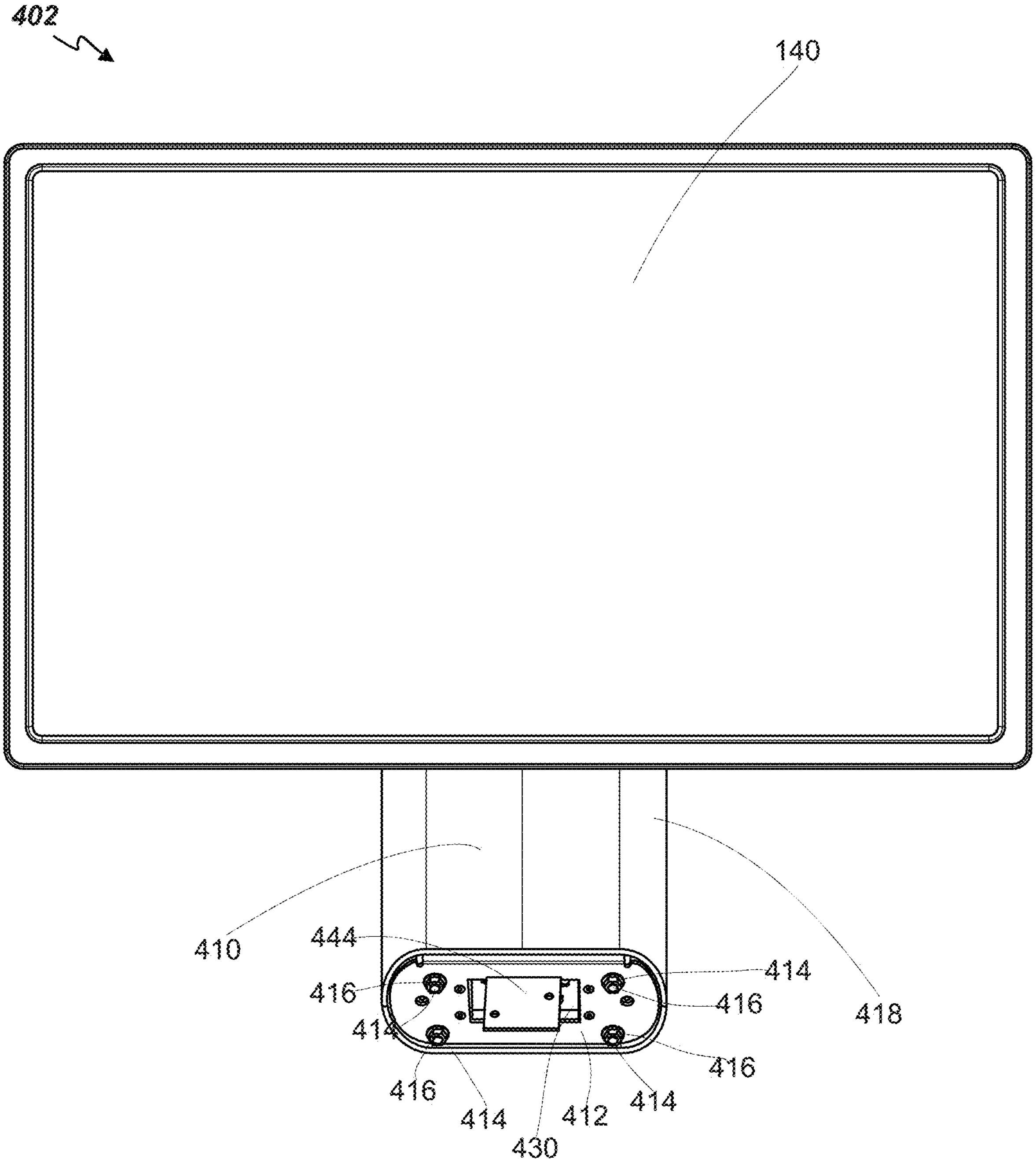
FIG. 13 is a front elevation view of a topper screen and mounting bracket of the gaming machine display mount system in accordance with some aspects of the present disclosure.

FIGS. 11-13 show additional exemplary views of one embodiment of a topper assembly 402. The topper assembly 402 may include a topper screen 140 fastened to a topper mounting bracket 410. The topper assembly 402 may optionally include a candle 138 (not show) fastened to the topper assembly 402 generally above the topper screen 140. Fastened to a lower end of the topper mounting bracket 410 may be an angled mounting plate 412. The angled mounting plate 412 may be welded or fastened with any traditional fastener to the topper mounting bracket 410. Alternatively, the angled mounting plate 412 may be an integral portion of the topper mounting bracket 410. The angled mounting plate 412 may include one or more mounting bolt(s) 414 and mounting nut(s) 416 threaded thereon, for example, four mounting bolts 414. These mounting bolt(s) 414 may be configured to align with the key slots 424 on the cabinet frame 420. The exemplary topper assembly 402 may also include a component receiving space 426 through which one or more electrical components may be received, inserted, and/or positioned. For example, the component receiving space 426 may provide access to a topper electrical panel 430. The exemplary topper assembly 402 may additionally include a cantilevered portion 444 for attaching a topper electrical connector 432. The cantilevered portion 444 may be an integral portion of the angled mounting plate 412 that has been bent into a perpendicular position relative to the angled mounting plate 412. Alternatively, the cantilevered portion 444, may be a separated component fastened to the angled mounting plate 412. The cantilevered portion 444 may be a simple metallic plate or part of a circuit board coupled to the topper electrical panel 430.

Figure 14:
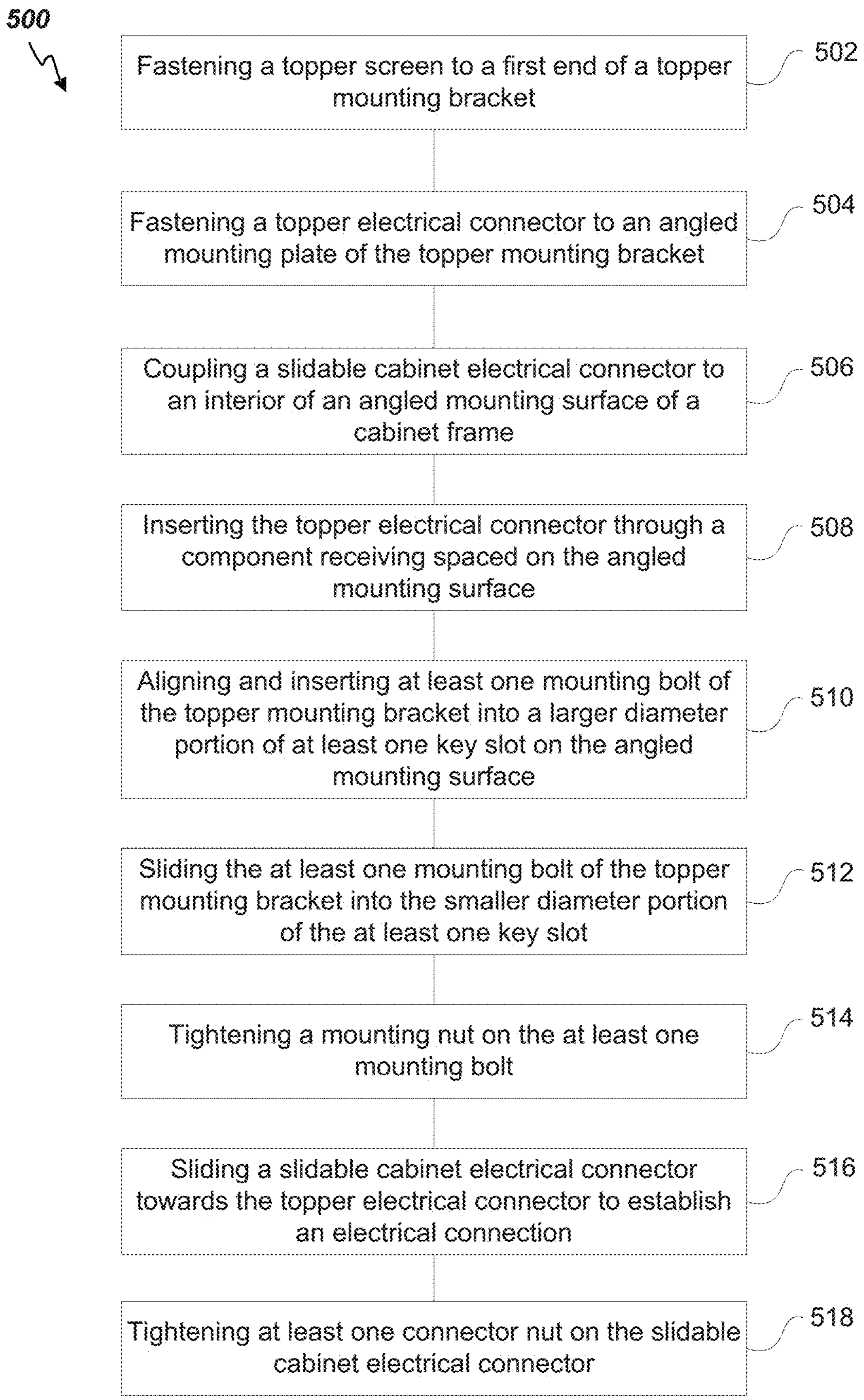
FIG. 14 is a flowchart of an exemplary method of assembling a topper mounting system for an electronic gaming machine, according to some aspects of the present disclosure.
Figure 15:
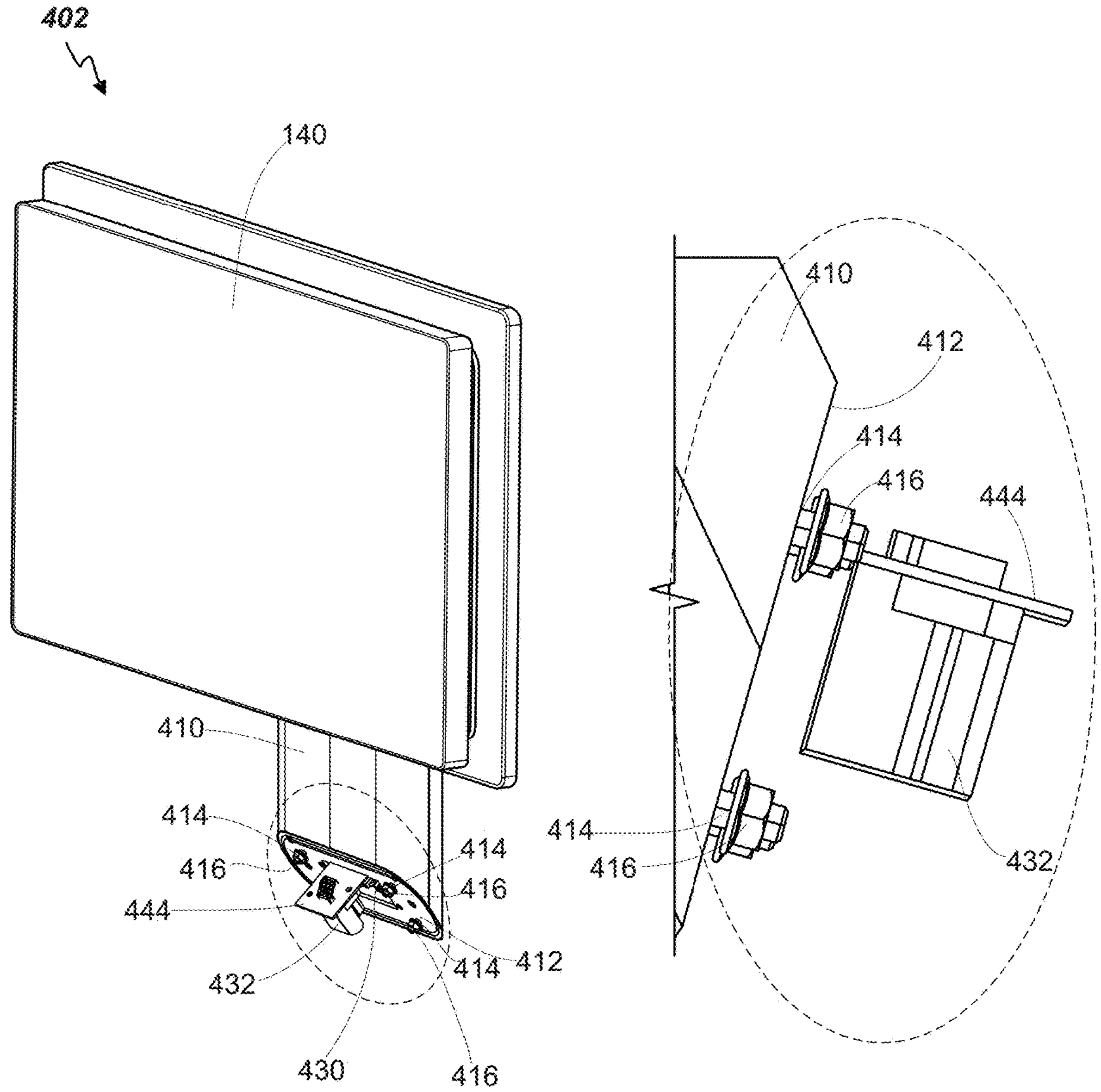
FIG. 15 is a perspective view of a topper screen and mounting bracket of the gaming machine display mount system, showing an exemplary topper electrical connector attached to the mounting bracket, in accordance with some aspects of the present disclosure.

FIG. 14 provides an exemplary method 500 for mounting a topper screen 140 to a gaming machine cabinet 116. In block 502, the topper screen 140 is fastened to a first end of a topper mounting bracket 410, for example as shown in FIG. 15.

In block 504, a topper electrical connector 432 is fastened to the angled mounting plate 412 of the topper mounting bracket 410. As shown for example in FIG. 15, the topper electrical connect 432 is fastened to a cantilevered portion 444 projecting perpendicularly from the angled mounting plate 412.

Figure 16:
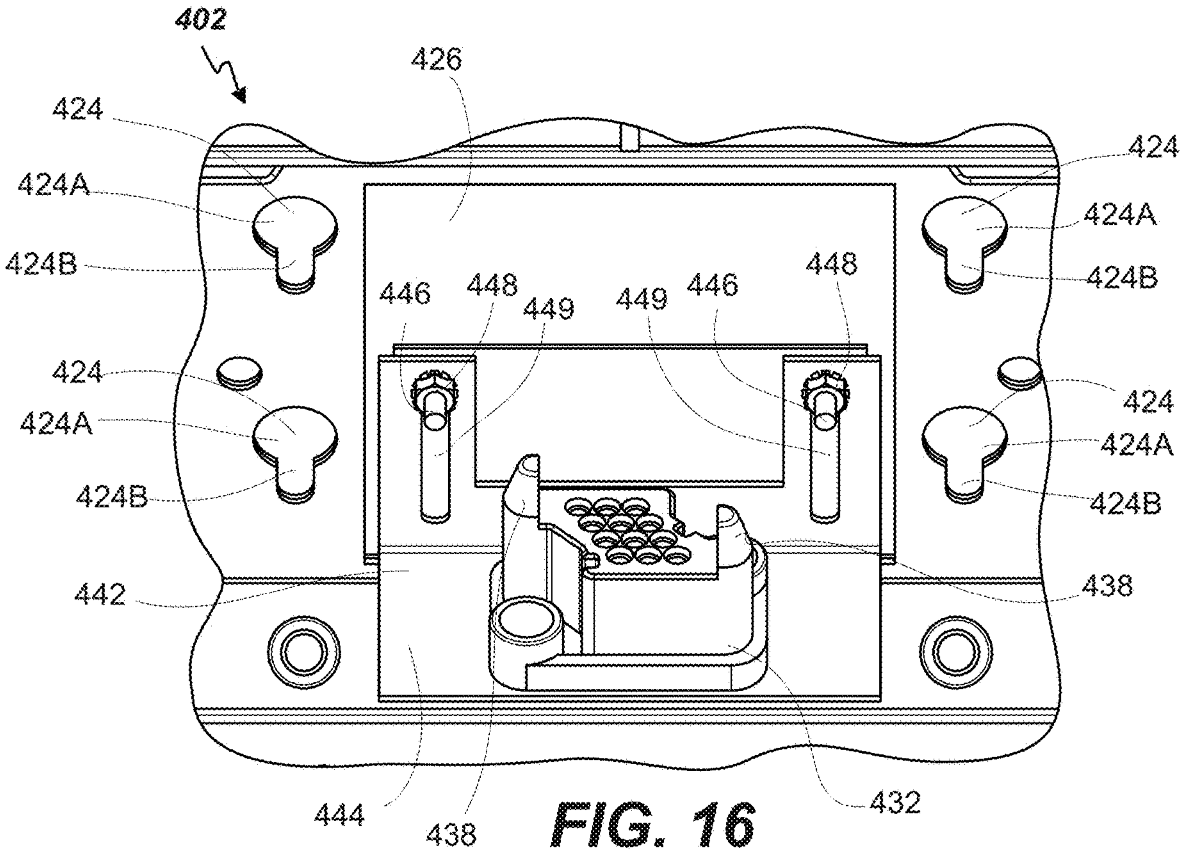
FIG. 16 is a detail front elevation view of an exemplary movable cabinet electrical connector attached to the cabinet frame, in accordance with some aspects of the present disclosure.
Figure 17:
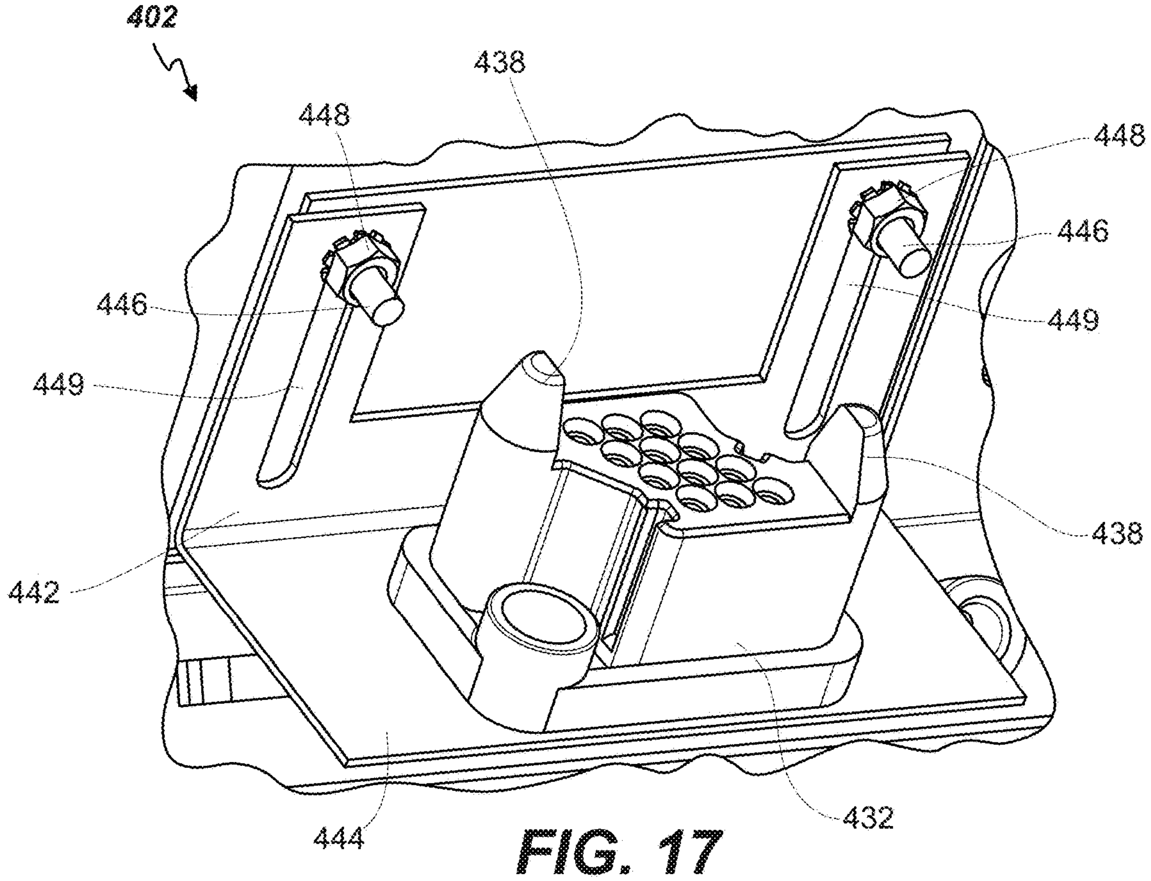
FIG. 17 is a detail perspective view of an exemplary movable cabinet electrical connector attached to the cabinet frame, in accordance with some aspects of the present disclosure.

In block 506, a movable cabinet electrical connector 456 is coupled to an interior of an angled mounting surface 422 of a cabinet frame 420. For example, as shown in FIGS. 16 and 17, the cabinet electrical connector 456 may be fastened to an L-shaped movable connector bracket 442 by inserting two bracket posts 446, attached to and projecting from the angled mounting surface 422, into respective bracket slots 449 and threading respective bracket nuts 448 onto the bracket posts 446.

Figure 18:
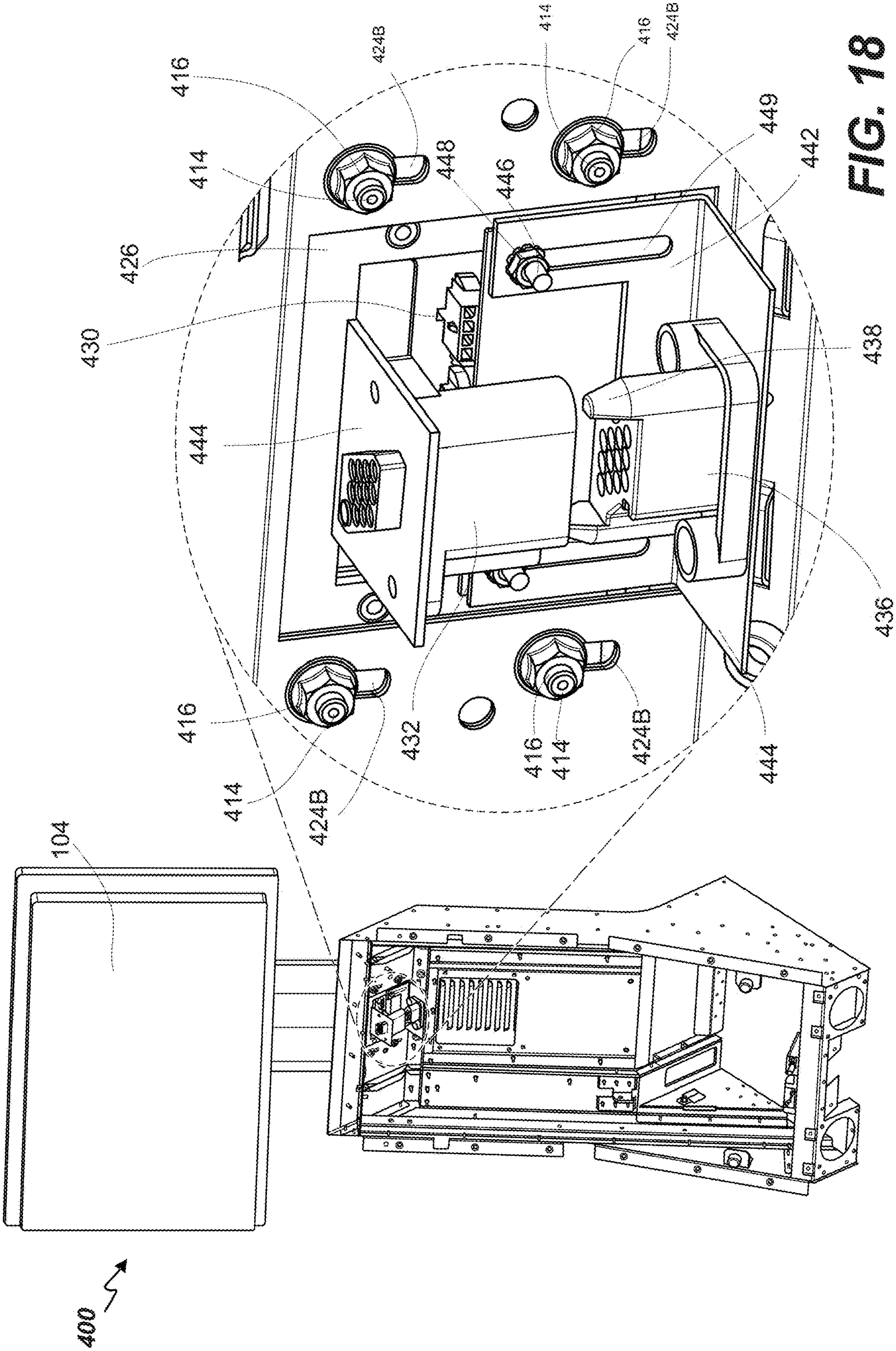
FIG. 18 is a detail perspective view of the mounting bolts of the topper screen and mounting bracket being aligned with and inserted into the key slot of the cabinet frame, according to some aspects of the present disclosure.

In block 508, the topper electrical connector 532 is inserted through a component receiving space 426 positioned on the angled mounting surface 422 of the cabinet frame 420, as shown for example in FIG. 18.

In block 510, the at least one mounting bolt(s) 414 of the topper mounting bracket 410 is aligned and inserted into a larger diameter portion 424A of the at least one key slot 424 of the cabinet frame 420. For example as shown in FIG. 18, all four mounting bolts 414 are aligned and inserted into the larger diameter portion 424A of the coinciding four key slots 424.

Figure 19:
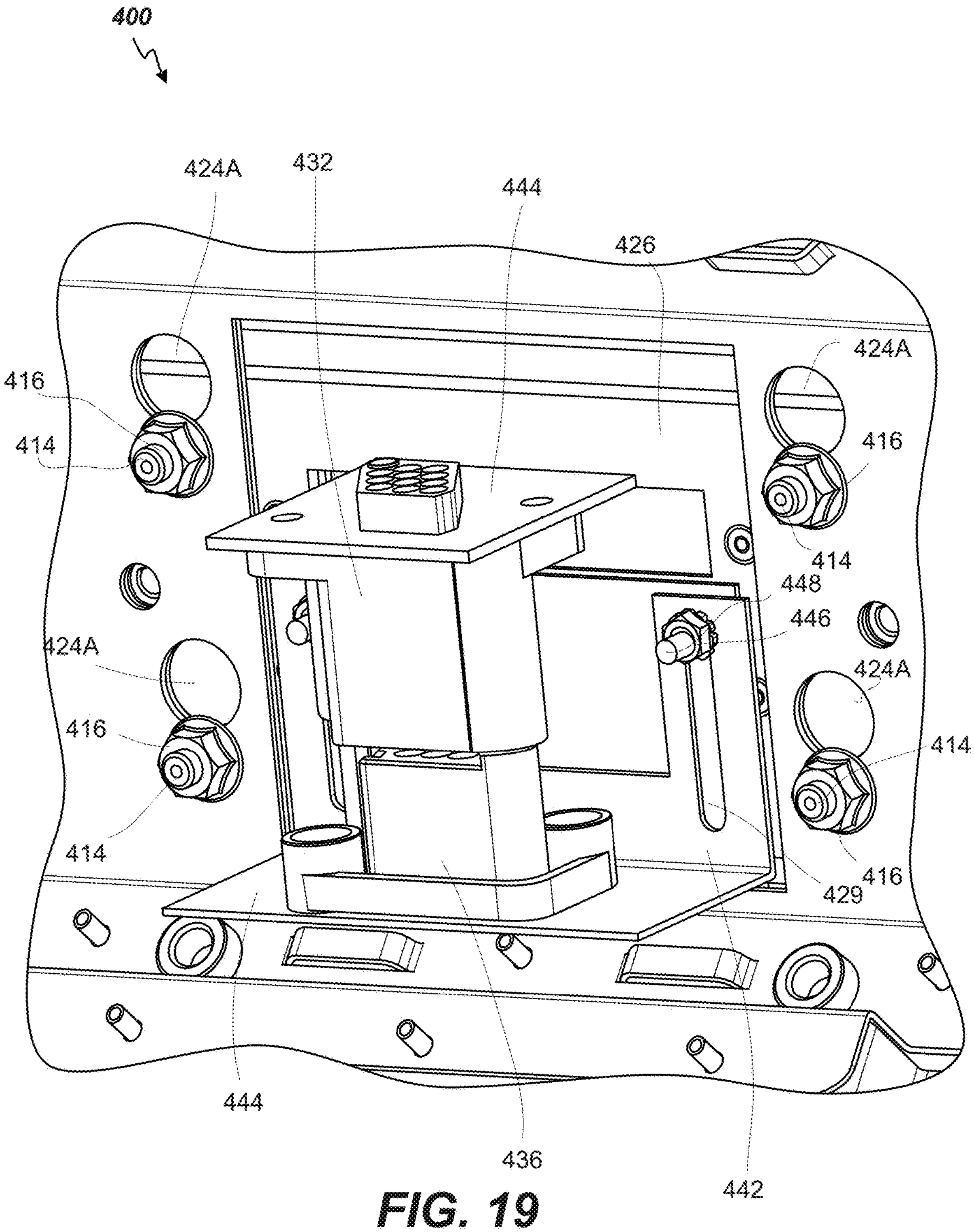
FIG. 19 is a detail perspective view of the topper screen and topper mounting bracket mounted to the cabinet frame after the mounting bolt(s) of the topper mounting bracket has been seated in the reduced diameter portion of the key slot(s) of the cabinet frame, and showing the topper electrical connector aligned with the movable cabinet electrical connector, positioned in a lowered non-connected position, according to some aspects of the present disclosure.

In block 512, the at least one mounting bolt 414 of the topper mounting bracket 410 is slid into the smaller diameter portion 424B of the at least one key slot 424 of the cabinet frame 420. For example as shown in FIG. 19, the entire topper assembly 402 is lowered such that all four mounting bolts 414 are positioned in the smaller diameter portion 424B of the coinciding four key slots 424, such that the topper assembly 402 is held in place and secured to the cabinet frame 420 and the topper electrical connector 432 is at least partially aligned with the cabinet electrical connector 436.

In block 514, a topper mounting nut 416 is tightened on the at least one mounting bolt 414. For example as shown in FIG. 19, four mounting nuts 416 are tightened on respective four mounting bolts 414, thereby fully securing and fixing a position of the topper assembly 402 relative to the cabinet frame 420.

Figure 20:
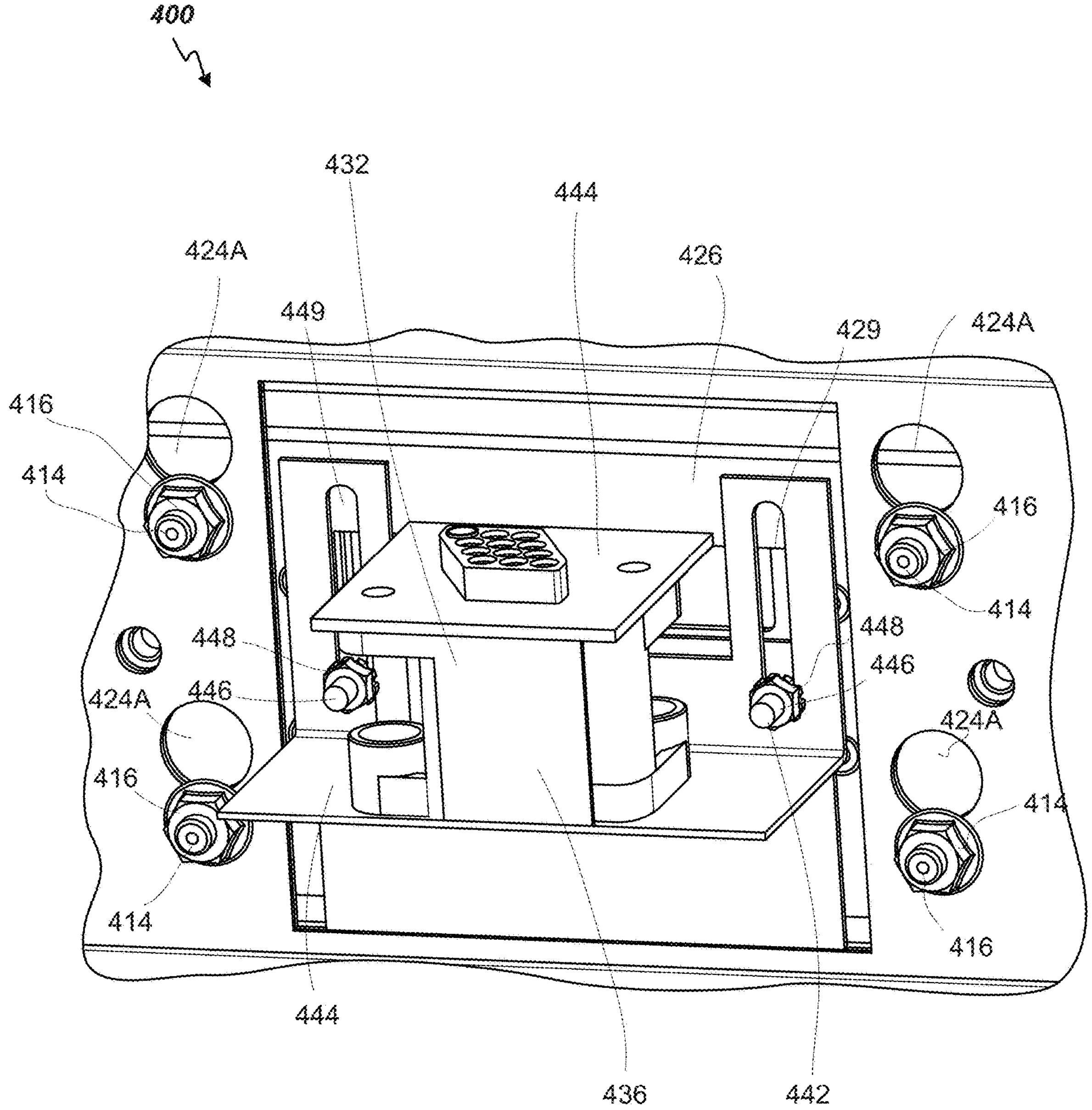
FIG. 20 is a detail perspective view of the topper screen and topper mounting bracket mounted to the cabinet frame and the topper electrical connector connected to the movable cabinet electrical connector, positioned in a raised connected position, according to some aspects of the present disclosure.

In block 516, a movable cabinet electrical connector 436 is slid towards the topper electrical connector 432 to connect the movable cabinet electrical connector 436 to the topper electrical connector 432 and establishing an electrical connection there between. For example as shown in FIG. 20, the cabinet electrical connector 436 is fastened to the L-shaped movable connector bracket 442, which is slid towards and engaged with the topper electrical connector 432 to establish the electrical connection.

In block 518, at least one bracket nut 448 is tightened to fix the position of the movable cabinet electrical connector 436 relative to the topper electrical connector 432. For example as shown in FIG. 20, two bracket nuts 48 are tightened on respective bracket posts 446, thereby securing the movable connector bracket 442, to which the cabinet electrical connector 436 is fastened.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A display mounting system, comprising:

a topper mounting bracket, comprising:

an angled mounting plate fastened to an end of the topper mounting bracket;

a topper electrical connector fastened to the angled mounting plate; and at least one mounting bolt fastened to and protruding perpendicularly from the angled mounting plate; and a cabinet frame, comprising:

an angled mounting surface comprising an interior and an exterior;

a component receiving space positioned on the angled mounting surface;

a cabinet electrical connector positioned on the interior of the angled mounting surface;

and at least one key slot, positioned on the angled mounting surface;

wherein:

the topper mounting bracket is operable to be mounted on the cabinet frame by engaging the at least one mounting bolt of the topper mounting bracket with the at least one key slot on the exterior of the angled mounting surface of the cabinet frame;

the component receiving space of the cabinet frame is operable to receive the topper electrical connector when the topper mounting bracket is mounted to the cabinet frame; and engaging the topper electrical connector with the cabinet electrical connector establishes an electrical connection between the topper electrical connector and the cabinet electrical connector.

2. The display mounting system of claim 1, wherein the at least one key slot comprises an upper larger diameter portion and a lower smaller diameter portion, and wherein the topper mounting bracket is operable to be mounted on the cabinet frame by inserting the at least one mounting bolt of the topper mounting bracket into the upper larger diameter portion of the key slot and subsequently lowering the topper mounting bracket thereby sliding the at least one mounting bolt of the topper mounting bracket into the lower smaller diameter portion of the key slot to secure the topper mounting bracket.

3. The display mounting system of claim 1, wherein the angled mounting plate of the topper mounting bracket and the angled mounting surface of the cabinet frame are parallel.

4. The display mounting system of claim 3, wherein the angled mounting plate has an angle between 30 and 60 degrees.

5. The display mounting system of claim 1, wherein the cabinet electrical connector comprises a movable cabinet electrical connector moveably coupled to the interior of the angled mounting surface of the cabinet frame, and wherein the topper electrical connector is aligned along a same plane with the movable cabinet electrical connector when the topper mounting bracket is mounted to the cabinet frame such that sliding the movable cabinet electrical connector along the same plane towards the topper electrical connector establishes an electrical connection.

6. The display mounting system of claim 5, wherein:

the topper electrical connector is mounted on a cantilevered portion which extends perpendicularly from the angled mounting plate of the topper mounting bracket such that the topper electrical connector is positioned in a plane parallel to the angled mounting plate; and the movable cabinet electrical connector is mounted on a movable connector bracket, and the movable connector bracket comprising a cantilevered portion which extends perpendicularly from the interior of the angled mounting surface of the cabinet frame, such that the movable cabinet electrical connector is positioned in a plane parallel to the angled mounting surface of the cabinet frame.

7. The display mounting system of claim 1, wherein:

the at least one mounting bolt comprises four mounting bolts, spaced adjacent a periphery of the angled mounting plate; and the at least one key slot comprises four key slots spaced to align respectively with the four mounting bolts when the topper mounting bracket is mounted to the cabinet frame.

8. A gaming machine including a display mounting system, comprising:

a gaming machine cabinet, the gaming machine cabinet enclosing a game controller, a processor, and memory;

a main display mounted to the gaming machine cabinet;

a topper screen; and a topper assembly, operable to mount the topper screen to the gaming machine cabinet above main display, the topper assembly comprising:

a topper mounting bracket operable to fasten to and support the topper screen at a first end, the topper mounting bracket comprising:

an angled mounting plate fastened to a second end of the topper mounting bracket;

a topper electrical connector fastened to the angled mounting plate; and at least one mounting bolt fastened to and protruding perpendicularly from the angled mounting plate, and the gaming machine cabinet comprising a cabinet frame, the cabinet frame comprising:

an angled mounting surface comprising an interior and an exterior;

a component receiving space positioned on the angled mounting surface;

a cabinet electrical connector positioned on the interior of the angled mounting surface; and at least one key slot positioned on the angled mounting surface;

wherein:

the topper mounting bracket is operable to be mounted on the cabinet frame by engaging the at least one mounting bolt of the topper mounting bracket with the at least one key slot on the exterior of the angled mounting surface of the cabinet frame;

the component receiving space of the cabinet frame is operable to receive the topper electrical connector when the topper mounting bracket is mounted to the cabinet frame; and engaging the topper electrical connector with the cabinet electrical connector establishes an electrical connection between the topper screen and the processor.

9. The gaming machine of claim 8, wherein the at least one key slot comprises an upper larger diameter portion and a lower smaller diameter portion, and wherein the topper mounting bracket is operable to be mounted on the cabinet frame by inserting the at least one mounting bolt of the topper mounting bracket into the upper larger diameter portion of the key slot and subsequently lowering the topper mounting bracket thereby sliding the at least one mounting bolt of the topper mounting bracket into the lower smaller diameter portion of the key slot to secure the topper mounting bracket and topper screen.

10. The gaming machine of claim 8, wherein the angled mounting plate of the topper mounting bracket and the angled mounting surface of the cabinet frame are parallel.

11. The gaming machine of claim 10, wherein the angled mounting plate has an angle between 30 and 60 degrees.

12. The gaming machine of claim 8, wherein the cabinet electrical connector comprises a movable cabinet electrical connector moveably coupled to the interior of the angled mounting surface of the cabinet frame, and wherein the topper electrical connector is aligned along a same plane with the movable cabinet electrical connector when the topper mounting bracket is mounted to the cabinet frame such that sliding the movable cabinet electrical connector along the same plane towards the topper electrical connector establishes an electrical connection.

13. The gaming machine of claim 12, wherein:

the topper electrical connector is mounted on a cantilevered portion which extends perpendicularly from the angled mounting plate of the topper mounting bracket such that the topper electrical connector is positioned in a plane parallel to the angled mounting plate; and the movable cabinet electrical connector is mounted on a movable connector bracket, the movable connector bracket comprising a cantilevered portion that extends perpendicularly from the interior of the angled mounting surface of the cabinet frame, such that the movable cabinet electrical connector is positioned in a plane parallel to the angled mounting surface of the cabinet frame.

14. The gaming machine of claim 8, wherein:

the at least one mounting bolt comprises four mounting bolts, spaced adjacent a periphery of the angled mounting plate; and the at least one key slot comprises four key slots spaced to align respectively with the four mounting bolts when the topper mounting bracket is mounted to the cabinet frame.

15. A display mounting system, comprising:

a topper mounting bracket, comprising an angled mounting plate fastened to an end of the topper mounting bracket and at least one mounting bolt fastened to and protruding perpendicularly from the angled mounting plate; and a cabinet frame, comprising an angled mounting surface and at least one key slot, comprising an upper larger diameter portion and a lower smaller diameter portion, positioned on the angled mounting surface, wherein:

the topper mounting bracket is operable to be mounted on the cabinet frame by inserting the at least one mounting bolt of the topper mounting bracket into the upper larger diameter portion of the key slot and subsequently lowering the topper mounting bracket thereby sliding the at least one mounting bolt of the topper mounting bracket into the lower smaller diameter portion of the key slot and thereby securing the topper mounting bracket.

16. The display mounting system of claim 15, wherein the angled mounting plate of the topper mounting bracket and the angled mounting surface of the cabinet frame are parallel.

17. The display mounting system of claim 16, wherein the angled mounting plate has an angle between 30 and 60 degrees.

18. The display mounting system of claim 15, wherein:

the at least one mounting bolt comprises four mounting bolts, spaced adjacent a periphery of the angled mounting plate; and the at least one key slot comprises four key slots spaced to align respectively with the four mounting bolts when the topper mounting bracket is mounted to the cabinet frame.

* * * * *